United States Patent [19]

Kato

[11] Patent Number: 5,202,773
[45] Date of Patent: Apr. 13, 1993

[54] MULTIPLE VALUE IMAGE INPUT DEVICE WITH CHROMATIC GRADATION CORRECTION

[75] Inventor: Yasuo Kato, Saitama, Japan

[73] Assignee: Fuji Xerox Co., Ltd., Tokyo, Japan

[21] Appl. No.: 596,292

[22] Filed: Oct. 12, 1990

[30] Foreign Application Priority Data

Dec. 22, 1989 [JP] Japan .................. 1-331363
Dec. 22, 1989 [JP] Japan .................. 1-331364
Dec. 28, 1989 [JP] Japan .................. 1-341751

[51] Int. Cl.⁵ .............................................. H04N 1/40
[52] U.S. Cl. ........................................ 358/461; 358/406
[58] Field of Search ............ 358/406, 461, 228, 475, 358/429, 455–456

[56] References Cited

U.S. PATENT DOCUMENTS

| | | | |
|---|---|---|---|
| 3,489,849 | 1/1970 | Hedger | 358/406 |
| 4,427,998 | 1/1984 | Huntoon | 358/406 |
| 4,903,144 | 2/1990 | Stefanik et al. | 358/461 |
| 4,974,098 | 11/1990 | Miyakawa et al. | 358/406 |
| 5,048,106 | 9/1991 | Nakajima et al. | 358/406 |

OTHER PUBLICATIONS

McConnell, Kenneth R. et al. "Fax: Digital Facsimile Technology & Applications", Artech House, Inc. 1989 pp. 164–169.

*Primary Examiner*—Stephen Brinich
*Attorney, Agent, or Firm*—Finnegan, Henderson, Farabow, Garrett and Dunner

[57] ABSTRACT

A multiple value image input device receives image data expressed in pixels with each pixel expressed in one density gradation level or shading. A method and device for correcting image data read by an image scanner has a density reference plate with a number indicating segments with known density gradation levels. The image scanner reads the density indicating segments and compares the actually read density gradation level with the known density gradation level. One or more density indicating segments is selected to be scanned. The selection may be based upon the image data to be read.

18 Claims, 24 Drawing Sheets

BEFORE CORRECTION   AFTER CORRECTION

BEFORE CORRECTION   AFTER CORRECTION

FIG. 18
| | |
|---|---|
| DATA ON DENSITY REFERENCE PLATE | 0 |
| | 5 |
| | 16 |
| | 24 |
| | 30 |
| | 37 |
| | 49 |
| | 56 |
| | 63 |
44A
(MAXIMUM VALUE "50" MINIMUM VALUE "10")
| |
|---|
| 34 |
| 50 |
| 10 |
| 11 |
| 11 |
| 13 |
| 12 |
| 50 |
| 49 |
| 50 |
DATA FOR ONE PAGE OF ORIGINAL SHEET } 50
FIG. 21
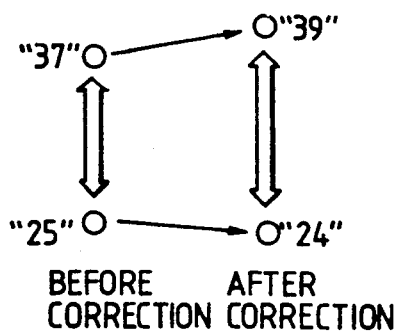
BEFORE CORRECTION    AFTER CORRECTION
FIG. 22
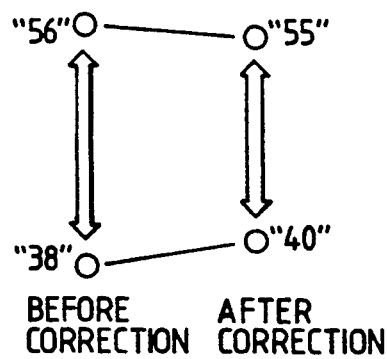
BEFORE CORRECTION    AFTER CORRECTION

BEFORE CORRECTION   AFTER CORRECTION

"16" → $0 + \frac{15}{19} \times (16 + 3) = 15$

"10" → $0 + \frac{15}{19} \times (10 + 3) = 10$

"-3" → $0 + \frac{15}{19} \times (-3 + 3) = 0$

BEFORE CORRECTION   AFTER CORRECTION

BEFORE CORRECTION   AFTER CORRECTION

BEFORE CORRECTION   AFTER CORRECTION

MULTIPLE VALUE IMAGE INPUT DEVICE WITH CHROMATIC GRADATION CORRECTION

BACKGROUND OF THE INVENTION

1. Field of the Invention

The present invention relates to a multiple value image input device which inputs picture images in multiple chromatic gradations. More particularly, the present invention relates to a multiple value image input device which corrects inaccuracies in the expression of chromatic grades.

2. Discussion of the Related Art

Picture image processing with a computer system is used extensively. Picture image input devices receive and transmit the existing picture images and photographs for such processing. Most known picture image input devices convert the input picture images into signals in binary values, as typically observed in the picture image input block in the conventional facsimile machine. However, such an image data processing method cannot reproduce halftones even if it can reproduce characters and line drawings. Halftone recording processes such as the "Dither Process" have been developed. Multiple value picture image input devices which are capable of performing the input of picture images in the form of data in multiple values comprise a large proportion of the Dither Process devices.

Shading correction is applied to the picture image data. Even if an identical part of an original sheet with the same degree of optical density is read, the levels of the signals output by the pixels will not be in complete agreement. Various factors, such as lack of uniformity in the sensitivity of the individual pixel detectors comprising the one-dimensional image sensor and a lack of uniformity in the quantity of light on the lines of the original sheet cause the inconsistencies.

Some image input devices are provided with a white plate (the density indicating block) arranged outside the original sheet reading area, and the one-dimensional image sensor reads the white plate before reading the original sheet. The device sets the density value so that the value read will be in agreement with the level of the white color for each of the individual pixels.

The picture images are acceptable, corrected if the correction is made with reference to the density of picture images in white color derived from the white color plate. However, multiple value image input devices process picture images on a scale of chromatic gradation composed of as many as 64 or 256 chromatic grades or tones. Differences among the individual pixels will occur in the density value corresponding to the color black if the individual pixel detectors differ in their dynamic range (namely, the difference between black and white). Even if the reference point for the white color is adjusted to the same level for the individual pixels, differences will occur. Because of this deviation, picture image data in multiple values for the individual pixels will not necessarily indicate an identical value even if the data is a gray color at an identical optical density.

This point is illustrated in FIGS. 37(a)-37(d). FIG. 37(a) illustrates a white shading correction plate 11. The white plate 11 is read with a one-dimensional image sensor 12, shown in FIG. 37 (b). The one-dimensional image sensor 12 is composed of n-pixel detectors from "1" to "n". Each image sensor 12 reads picture images pixel by pixel.

Each image pixel is expressed in a density gradation value or shading. The density gradation values are also typically referred to as chromatic gradation levels. In this example, each image pixel is ideally expressed in one of the 64 density values from "0" to "63".

FIG. 37(c) shows the dynamic ranges of the density value of four pixel detectors, the first, third, fifth, and n-th pixel detectors. In this example, the first pixel detector has a density value range from "0" to "63" from the white color plate 11 to the dark state. The first pixel is expressing the desired density values, and can accurately indicate chromatic gradation without correction.

The third pixel expresses a dynamic range from "−1" to "62". The third pixel can accurately indicate chromatic gradation with the addition of "1" to all the levels in order to adjust to "0" the density value indicated for the white color plate 11. A satisfactory correction can be made of the output from the third pixel in this example.

The fifth pixel changes its density value from "10" to "55" from the white color plate 11 to the dark state. Even if a correction is made to subtract "10" from each of the levels, the levels of the chromatic gradation indicated by the fifth pixel will be in the range from "0" to "45", as shown in FIG. 37(d). A black color is corrected to a gray color, and a gray color is corrected to a brighter gray color. Therefore, a satisfactory correction of the fifth pixel is not possible.

The n-th pixel shows a state opposite to the fifth pixel. The dynamic range of the n-th pixel is wider than the normal range extending from "−5" to "67". When a correction is made by the addition of "5" to all the density values in the range, the density values will be in the range from "0" to "72." The comparatively dark gray color will be corrected to black, while the other gray shades will be corrected to darker gray shades. Therefore, a satisfactory correction of the n-th pixel is not possible.

The description given above is based on the assumption that the sensitivity of the individual pixels show the same characteristics over the entire wavelength region. However, the sensitivity of the individual pixels may not be uniform for the individual density values. For instance, some pixel detectors have a higher sensitivity in the lower brightness region of the scale of chromatic gradation, while other pixel detectors have higher sensitivity in the higher brightness region of the scale. The gray color which should be a constant density value may be rendered in gray shades with different density values because the individual pixel detectors have different responses to the changes in brightness even though they have identical dynamic range.

Corrections made to compensate for the differences in the sensitivity of the individual pixel detectors in the one-dimensional image sensor have been discussed. The problem exists in which corrections made for the influences of other factors such as the quantity of light.

An example of the actual output levels from a multiple value image input device is shown by the solid line 14 in FIG. 38. When the density of the picture image data is represented in the form of data in eight bits (in 256 stages), the actual output level is expressed in six bits (in 64 stages). The one-dot chain line 15 indicates the desired output characteristics. Thus, the output characteristics of a multiple value image input device are not simple. A variety of factors are intertwined in output characteristics formation, and proper correction of chromatic gradation for the reproduction of halftone is, therefore, difficult.

Fluctuations also occur while reading each line in the subsidiary direction of scanning with the one-dimensional image sensor. The following factors can be pointed out as the causes of such fluctuations changes in the distance from the original sheet due to vibrations in the scanner which moves the one-dimensional image sensor in the subsidiary scanning direction; changes in the light quantity accumulating time due to fluctuations in the speed of the scanner caused by vibrations in the unit; and changes in the quantity of light from the light source during the subsidiary scanning operation.

SUMMARY OF THE INVENTION

An object of the present invention is to provide a multiple value image input device for correcting image density gradation levels using a relatively small number of density indicating segments.

Another object of the present invention is to correct image density gradation levels by automatically selecting a desired density indicating segment.

Still another object of the present invention is to correct the density gradation levels in the main scanning direction and in the subsidiary scanning direction.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the above objects a method for correcting image data read by an image scanner with at least one pixel detector, the image data represented by image pixels expressed in density gradation levels is provided. The method comprising the steps of providing a plurality of density indicating segments, each segment having a known density gradation level; selecting at least one of the plurality of density indicating segments; scanning at least one selected density indicating segment to obtain actually read density gradation levels for each pixel detector; and comparing the actually read density gradation levels to the known density gradation levels.

BRIEF DESCRIPTION OF THE DRAWINGS

The accompanying drawings, which are incorporated in and constitute a part of this specification illustrate embodiments of the invention and, together with the description, serve to explain the principles of the invention. In the drawings.

FIG. 18 is a chart showing data stored in a memory device when the reading operation is completed;

FIG. 21 is a diagram illustrating the correction with respect to a second area;

FIG. 22 is a diagram illustrating the correction with respect to a third area;

DETAILED DESCRIPTION OF THE PREFERRED EMBODIMENTS

Figure 1:
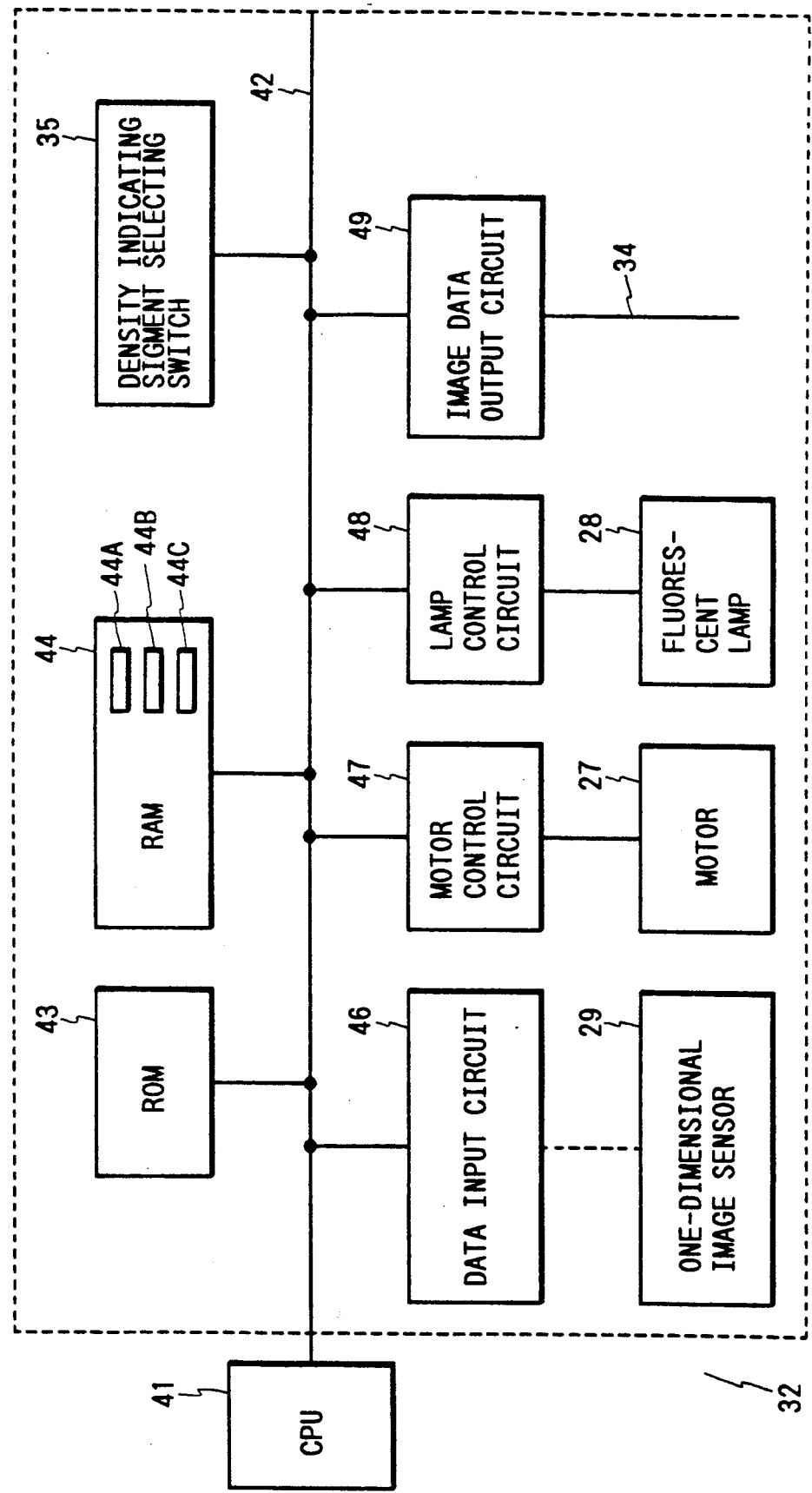
FIG. 1 is a block diagram illustrating a circuit for a multiple value image input device according to a first preferred embodiment of the present invention.

The following picture image input device has been developed to compensate for the above problems.

A picture image input device has a one-dimensional image sensor. A density reference plate arranged in the main scanning direction has a plurality of optical density degrees. Density indicating segments for gray color at several different degrees of optical density are provided in addition to the standard density indicating segments for black and white. Using these segments, the ideal reading density values and the actually measured values are compared, and the reading density are corrected on the basis of the comparison.

It is possible to set up dynamic ranges of density values on the basis of the density indicating segments for black and white and additionally t correct the reading density for halftones using several levels of gray color. However, as the range of gray shades is broad, the system cannot perform correction suitable for the various types of original sheets unless several gray color density levels are used in the correction process. Yet, if different gray shades are used on the density indicating segments, all the density indicating segments are used for correcting the density values when actual corrections are made on an original sheet. The arithmetic operations for carrying out this process are complicated, and a high-speed central processing unit (CPU) or a dedicated CPU is required for executing the arithmetic operations.

Even if a comparatively large number of density indicating segments are provided, some original sheets require considerable complementary corrections of the chromatic gradation levels because a density indicating segment does not exist at a degree of density identical to or in the proximity of the halftone to be read. Some errors in the chromatic gradation levels are unavoidable after correcting when a large number of density values, as many as 256 stages for example, are used. The process can only give expressions for chromatic gradations of a number of stages reduced in real terms from the nominal number of expressible chromatic gradation stages.

According to a first aspect of the present invention, a multiple value image input device has a one-dimensional image sensor, having many pixel detectors for photoelectric conversion. A number of density indicating segments with different degrees of optical density ar arranged in parallel to the main scanning direction of the one-dimensional image sensor. An analog-digital convertor converts the output of the one-dimensional image sensor into image data with multiple values. A density indicating segment selector selects one or more of the density indicating segments. A memory device stores, for each pixel, the actually measured value read by the one-dimensional image sensor and converted into image data with multiple values with respect to the density indicating segment or segments selected by the density indicating segment selector. A multiple value image data corrector makes complementary corrections of the image data in multiple values obtained for each pixel. The corrections are made on the basis of the actually measured density values and the actual degrees of optical density in the density indicating segments for the respective measured values.

The multiple value image input device according to the first aspect of the present invention selects one or more density indicating segments with the density indicating segment selector and uses only those density indicating segments which are necessary for correction.

A multiple value image input device according to a second aspect of the present invention has a one-dimensional image sensor with many pixel detectors for photoelectric conversion A number of density indicating segments with different degrees of optical density are arranged in parallel to the main scanning direction of the one-dimensional image sensor. An analog-digital convertor converts the output of the one-dimensional image sensor into image data in multiple values. The original sheet is prescanned with the one-dimensional image sensor. A density indicating segment selector selects on the basis of the distribution of density in the prescanned picture image date a number of density indicating segments which respectively indicate mutually different degrees of density to be taken for reference in reading the original sheet. A memory device stores, for each pixel, the actually measured density value read by the one-dimensional image sensor converted into image data in multiple values with respect to the density indicating segments selected by the density indicating segment selector. A multiple value image data corrector makes complementary corrections to the image data in multiple values obtained for each pixel by reading the original sheet, and correcting on the basis of the actually measured values and the actual degrees of optical density in the density indicating segments for the respective measured values.

The multiple value image input device according to the second aspect of the present invention selects density indicating segments based upon the density of the original sheet determined in advance by prescanning.

A multiple value image input device according to a third aspect of the present invention has a one-dimensional image sensor with many pixel detectors for photoelectric conversion. A number of density indicating segments with different degrees of optical density are arranged in parallel to the main scanning direction of the one-dimensional image sensor. An analog-digital convertor converts the output of the one-dimensional image sensor into image data in multiple values. An image memory device stores one page of picture image data read by the one-dimensional image sensor. A density indicating segment selector selects on the basis of the distribution of density in the picture image data, a number of density indicating segments which indicate mutually different degrees of density to be taken for reference in reading the original sheet. A memory device stores, for each pixel, the actually measured density value read by the one-dimensional image sensor converted into image data in multiple values with respect to the density indicating segments selected by the density indicating segment selector. A multiple value image data corrector makes complementary corrections of the image data in multiple values obtained for each pixel by reading the original sheet, and correcting on the basis of the actually measured values and the actual degrees of optical density in the density indicating segments for the respective measured values.

The multiple value image input device according to the third aspect of the invention determines the density of the original sheet when it transmits the picture image data into the image memory device or by using the picture image data stored in the image memory device. A number of density indicating segments suitable for use as references in reading an original sheet are selected from a number of density indicating segments provided in advance on the basis of the density distribution found for the original sheet.

The multiple value image input device corrects the picture image data stored in the image memory device, taking a pixel as the unit, by comparing the actual density with the density value as actually measured from the density indicating segments.

A multiple value image input device according to a fourth aspect of the present invention has a one-dimensional image sensor with many pixel detectors for photoelectric conversion. A first density reference area with a prescribed degree of density is arranged in the main scanning direction of the one-dimensional image sensor. A first corrector corrects multiple value picture image data in pixel units, at the time of reading the original sheet, on the basis of the output from the first density reference area. A second density reference area with a plurality of density indicating segments with different degrees of optical density is arranged in the subsidiary scanning direction of the one-dimensional image sensor. A density indicating segment selector selects one or more density indicating segments for use in the density correction. The at least on segment is selected from the density indicating segments forming the second density reference area on the basis of the distribution of density in the image data of a line of the original sheet. A second corrector corrects the image input data on the corresponding line on the basis of the output from the density indicating segments as determined for each line by the density indicating segment selector.

The multiple value image input device according to the fourth aspect of the present invention attains greater accuracy in the correction of chromatic gradation in the subsidiary scanning direction. A density reference plate is arranged in the main scanning direction and a second density reference plate is arranged in the subsidiary scanning direction. Any desired density indicating segment or segments may be selected for the correction of density gradation in the subsidiary scanning direction out of the plurality of the density indicating segments.

Reference will now be made in detail to the preferred embodiments of the present invention as illustrated in the accompanying drawings, in which like reference characters designate like o corresponding parts throughout the several drawings.

Figure 2:
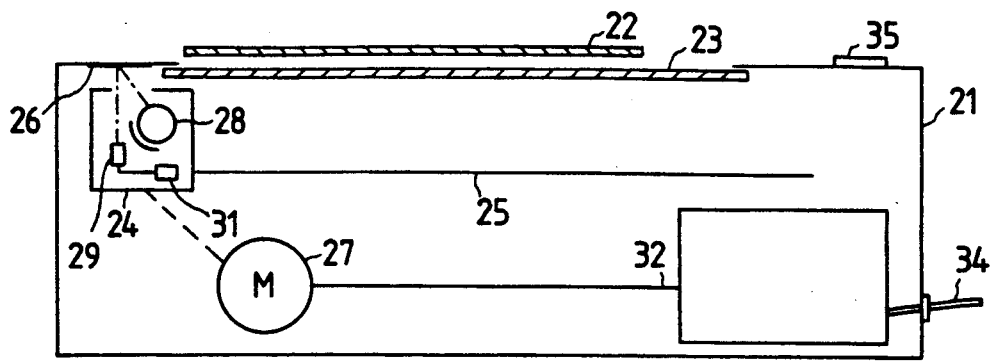
FIG. 2 is a partially schematic cutaway view of the multiple value image input device according to the first preferred embodiment of the present invention.

FIG. 2 illustrates a partially schematic cutaway view of a multiple value image input device 21 according to a first embodiment of the present invention.

The multiple value image input device 21 has a platen glass 23 on the upper area of the main unit on which an original sheet 22 is set. A scanner 24 and a guide rail 25 are arranged in the inside of the main unit. The guide rail 25 guides the movement of the scanner 24 in forward and reverse directions. A density reference plate 26 is arranged over the entire width of the platen glass 23. A motor, which is installed on bottom area of the main unit of the device, provides the power for the reciprocating movement of the scanner 24.

A fluorescent lamp 28, in the scanner 24, projects a beam of light onto the original sheet 22 and a one-dimensional image sensor 29. The image sensor 29 performs photoelectric conversion of the rays reflected from the original sheet 22.

Video signals from the one-dimensional image sensor 29, in synchronization with a clock signal, are amplified by a video amplifier 31, and fed into an electronic circuit block 32. The chromatic gradation of the video signals is corrected, and the video signals are then fed out by way of a cable 34 to an image editing device not illustrated in the Figure. The electronic circuit block 32 also performs ordinary circuit operations such as driving the motor 27 and controlling the one-dimensional image sensor 29.

Near the platen glass 23, a density indicating segment selecting switch 35 is provided for selecting desired segments out of the density indicating segments arranged on the density reference plate 26.

FIG. 1 illustrates the principal parts of the circuit construction of the multiple value image input device according to the first embodiment.

The electronic circuit is equipped with an electronic circuit block 32 and a central processing unit (CPU) 41. A bus 42, preferable a data bus, connects the CPU 41 to each of the other elements of the circuit described below.

A read only memory device ROM 43 stores programs which execute various control operations for the multiple value image input device.

A random access memory RAM 44 used as a work memory device is connected to the CPU 41. The RAM 44 is divided into several sections. An actually measured value storage area 44A stores the actually measured values for the individual pixels read from the density reference plate 26 (shown in FIG. 2). A before-correction storage area 44B stores the before-correction multiple value image data from the original sheet. A corrected data storage area 44C stores the corrected multiple value picture image data.

A data input circuit 46 is connected to the CPU 41. The data input circuit 46 receives the signals from the one-dimensional image sensor 29 amplified by the video amplifier 31, converts the amplified signals into multiple value picture image data, and transmits the data to the bus 42.

A motor control circuit 47 is connected to the CPU 41. The motor control circuit 47 controls a motor 27 to move the scanner 24 under the scanning density reference plate 26. The motor control circuit 47 also controls scanning the original sheet 22 with the scanner 24, and returning the scanner 24 to a home position.

The density indicating segments are selected first, and then the normal reading operation is performed using the selected density indicating segments.

A lamp control circuit 48 is connected to the CPU 41. The lamp control circuit 41 controls turning on the fluorescent lamp 28.

An image data output circuit 49 is connected to the CPU 41. The image data output circuit 49 feeds corrected multiple value picture image data stored in the corrected data storage area 44C to the cable 34 at a prescribed transfer rate.

A density indicating segment selecting switch 35 is connected to the CPU 41. The switch 35 selects desired segments out of a plurality of density indicating segments provided on the density reference plate 26. In the first preferred embodiment, density correction is performed with four density indicating segments selected from seven density indicating segments on the density reference plate 26.

Figure 3:
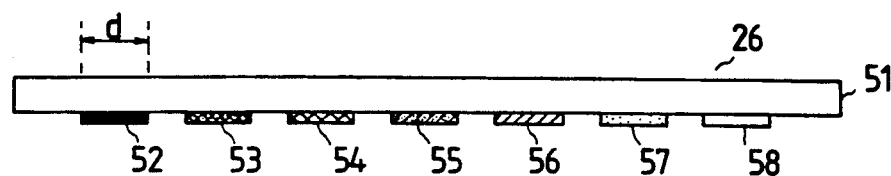
FIG. 3 is an enlarged scale side view of a density reference plate.

FIG. 3 illustrates a side view of the density reference plate 26 according to the first embodiment. The density reference plate 26 is formed by printing seven density indicating segments 52-58 on a plastic substrate 51. The segments 52-58 have a narrow strip shape. The strip width d of the density indicating segments 52-58 is 4 mm, and a 2 mm space is provided between the individual strips. The first density indicating segment 52 is printed in black ink. The second density indicating segment 53 is printed in a relatively dark gray ink. The third through sixth density indicating segments 54-57 are printed in progressively brighter ink in the stated order. The seventh density indicating segment 58 is printed in white ink.

Figure 4:
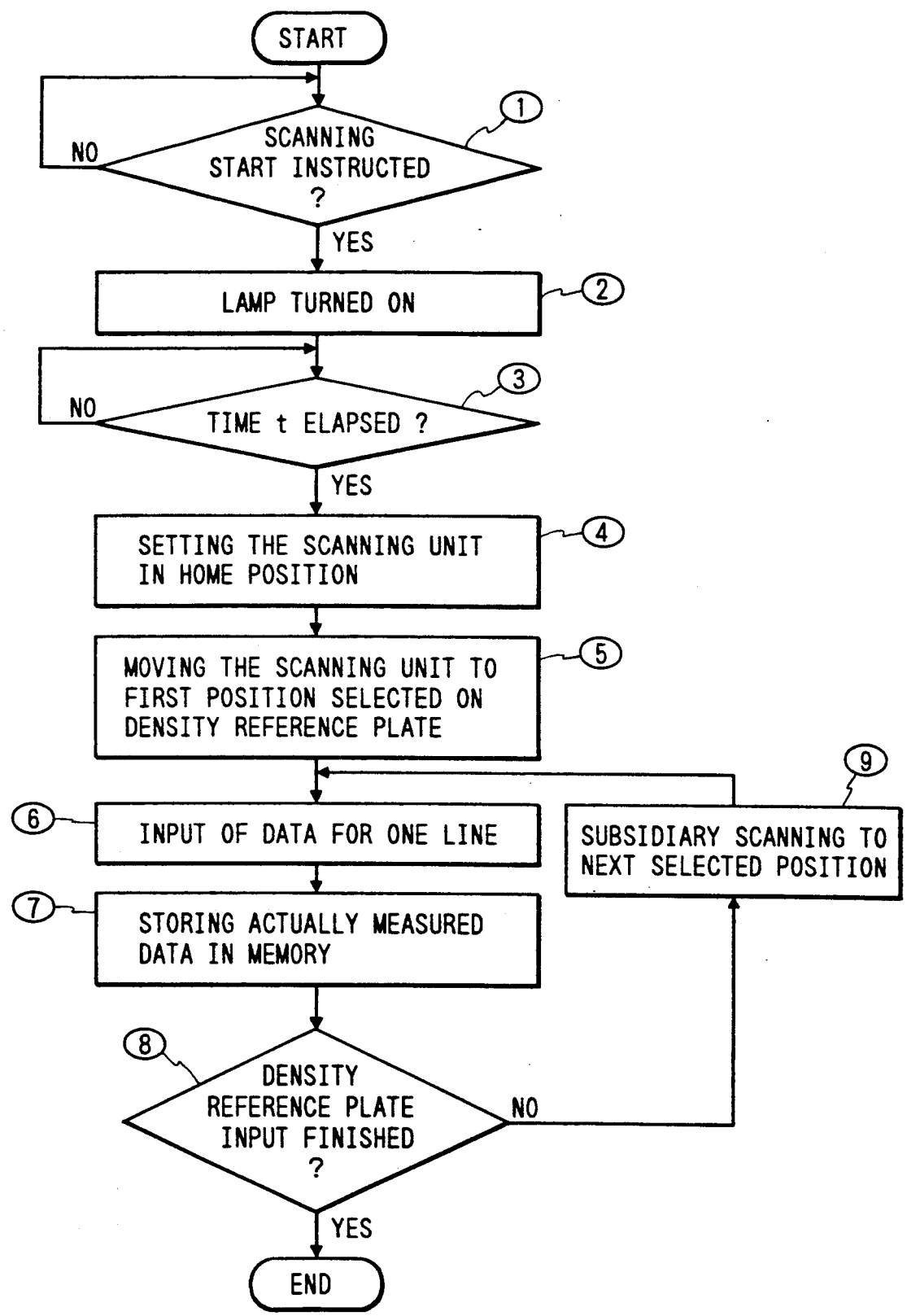
FIG. 4 is a flow chart showing a method for reading the density reference plate shown in FIG. 3.

FIG. 4 is a flow chart of the operation for reading the density reference plate in the multiple value image input device 21.

In step 1, an instruction is issued for the start of a scanning operation. In step 2, the CPU 41, shown in FIG. 1, turns on the fluorescent lamp 28 by controlling the lamp control circuit 48. The fluorescent lamp 28 needs a period time t, approximately two to five seconds, to achieve a stably light state. The CPU 41, in step 3, measures the period of time t. Upon the elapse of the period of time t, a "Yes" is indicated and the CPU 41 moves the scanner 24 to a home position. In the normal operation, the scanner 24 is returned to the home position when the reading is completed. However, if the power is turned off or a power failure occurs during the scanning, the scanner 24 may be stopped at a point other than the home position. Hence, a sensor detects whether the scanner 24 is in the home position.

After the scanner 24 is set in the home position, the CPU 41, in step 5, directs the motor control circuit 47 to move the scanner 24, by a subsidiary scanning operation, under the density indicating segment with the lowest degree of brightness among those segments selected from the density reference plate 26. With the scanner 24 set in this state, the multiple value image input device, in step 6, reads data for one scanning line, and in step 7, stores data for one scanning line and, in step 7, stores data in the actually measured value storage area 44A as the actually measured value for the area in the particular ink. In step 8, the CPU 41 checks whether all the density indicating segments 52-56 have been read. If the reading operations are not yet completed a "No" is indicated, and another subsidiary scanning operation is performed, in step 9, to advance the reading position of the scanner 24 to the next selected density indicating segment.

Preferably, the multiple value image input device reads picture images at the scanning density of 400 dpi (dots per inch). In this example, the density indicating segments specified by the density indicating segment selecting switch 35 are the fifth through the seventh, density indicating segments 52 and 56 through 58. The scanner 24 moves from the first density indicating segment 52 to the fourth density indicating segment 56 during the subsidiary scanning operation performed for 378 lines. In step 6, the scanner 24 reads data for one line, and the value obtained is stored, in step 7, in the actually measured value storage area 44A as the actually measured density value for the particular density indicating segment.

In step 8, the actually measured density values are obtained in the same manner for the remaining selected density indicating segments 56 and 58 and stored in the actually measured value storage area 44A to complete reading the density reference plate 26.

In the operation described above, the individual density indicating segments 52 through 58 are read one line at a time. The density indicating segments on more than one line may be read at a time, and the average value of the read values for the individual lines calculated. To eliminate noise components, the maximum value and the minimum value from the read values for each pixel, taken as a unit, are not considered when calculating the average.

The control operations shown in FIG. 4 take the actually measured values into the RAM 44 without any condition. However, if the density reference plate 26 deviates from its normal position, the background area of the density reference plate 26 is included in the read data. In such a case, it is advisable to discontinue the measurement, reset the scanner 24 in the home position, and read the density reference plate 26 again from the beginning.

Figure 5:
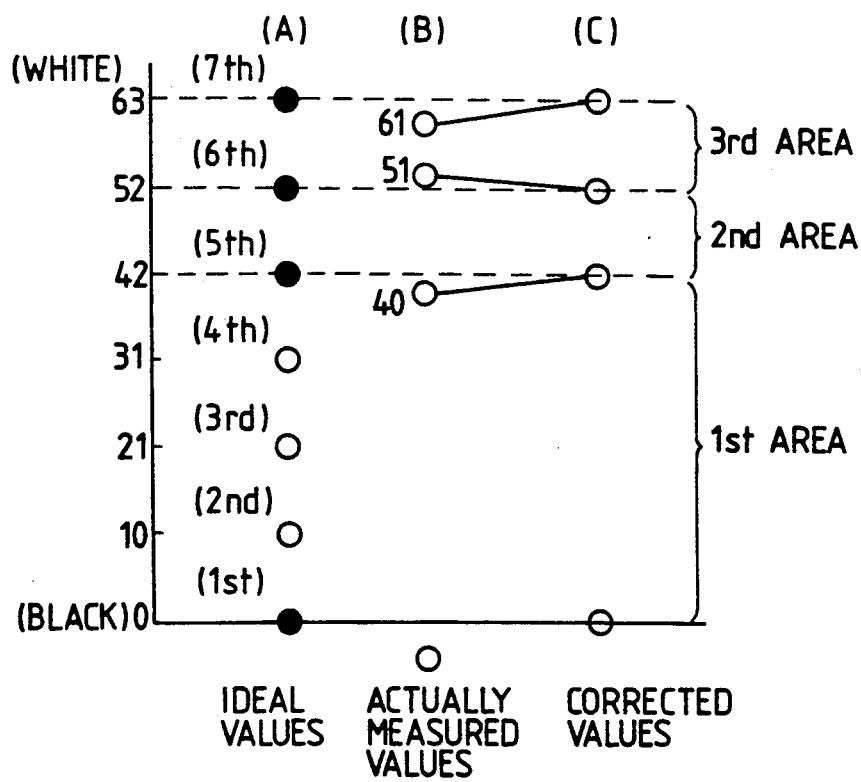
FIG. 5 is a chart illustrating values actually measured for individual density indicating segments and a method of density correction.

FIG. 5 illustrates an example of actually measured values for each of the density indicating segments 52 through 56. FIG. 5 also shows a density correction method. Column (A) lists the density values representing chromatic grades for the seven density indicating segments 52-58 stored in the ROM 43. The four values marked by a solid dot represent density values which correspond ideally to the optical density values of the four density indicating segments 52 and 56 through 58 which have been selected by the density indicating segment selecting switch 35. The three values marked by a large hollow dot represent density values of the same nature for the three density indicating segments 53-55 which have not been selected by the density indicating segment selecting switch 35. In the first preferred embodiment, the density values in the first to seventh density indicating segments 52-58 are "0", "10", "21", "31", "42", "52", and "63", respectively.

In FIG. 5, column (B) lists actually measured values stored in the actually measured value storage area 44A. The actually measured density value of the first density indicating segment 52 for black is "−3", while the ideal known value is "0". The actual measured density value is increased by 3 to obtain a corrected density value "0" shown in column (C). The actually measured density value of the fifth density indicating segment 57 is "40", while the ideal known value for the fifth segment is "42". The actual value will be increased by 2 to obtain the corrected density value "42". The comparison and correcting process is repeated for the other actually measured density values.

In the first preferred embodiment, the total range of density values are divided into a first area, a second area, and a third area in the regular order starting from the side with the black color. Each area is corrected using one of the selected density indicating segments. As shown in FIG. 5, the second and third areas have a narrower width of density values than the first area. The are widths are different so that the density values are corrected in a relatively favorable condition. The selection of the four density indicating segments 52 and 56 through 58, in this example, is for a highly accurate representation of the chromatic gradation in those parts of the original sheet where the shades are relatively close to white.

Figure 6:
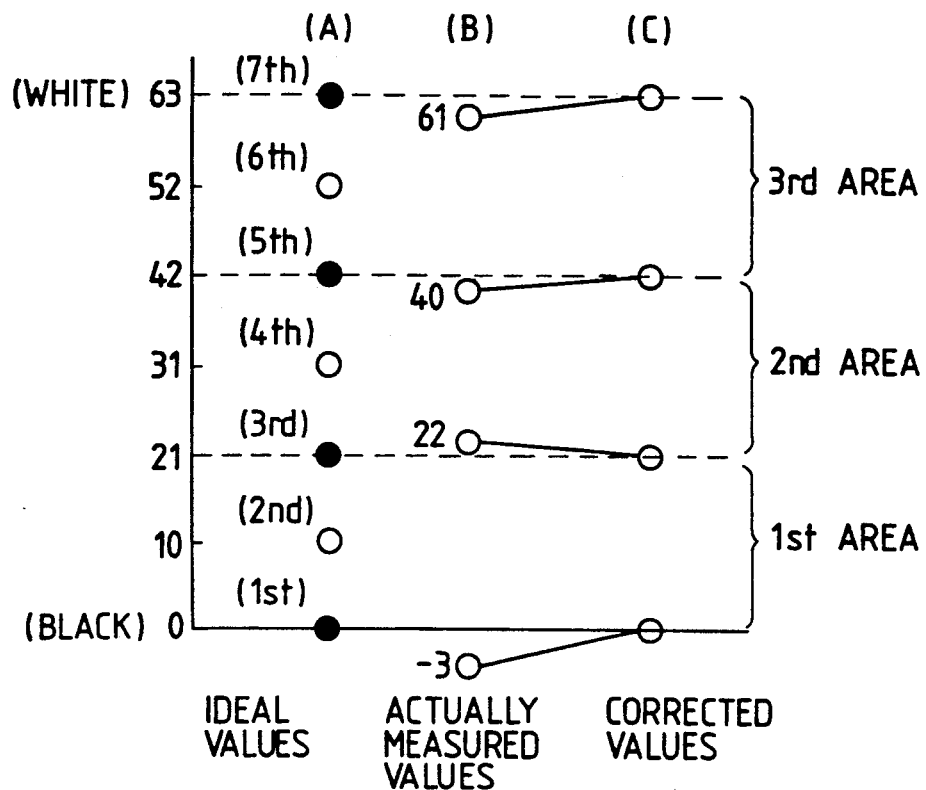
FIG. 6 is a chart illustrating the selection of density indicating segments for an original sheet with relatively uniform optical density distribution.

FIG. 6 shows an example of selecting density indicating segments when the optical density of the original sheet has a relatively uniform distribution. This example is in contrast to the example cited in the preceding paragraph. The first, third, fifth and seventh density indicating segments 52, 54, 56, and 58 are selected by the density indicating segment selecting switch 35. The selections are shown in column (A). The first, second and third areas have almost equal widths because the density correcting points are set at almost identical intervals. Thus, the corrections are made without deviation over the entire density range for the original sheet. Even if the same number of density indicating segments are selected, the correction characteristics can be changed, by selecting different density indicating segments 52-58.

Corrections are made with high accuracy near the selected density indicating segments. Specific density gradations may be selected for correction. For example, the density gradation at which a person's face is likely to be rendered may be chosen for correction.

Figure 7:
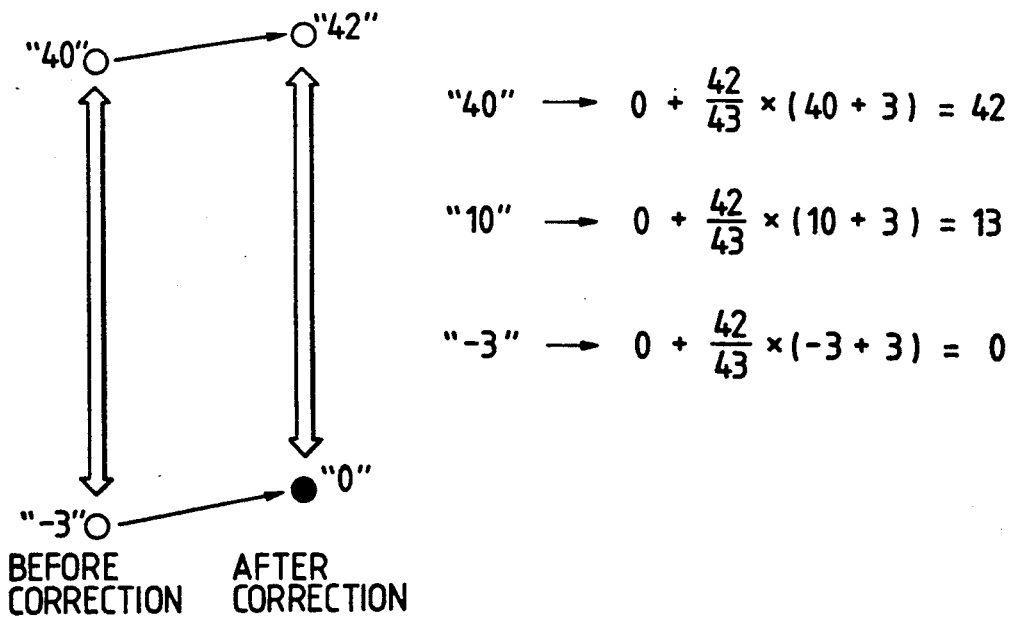
FIG. 7 is a chart illustrating the correction in respect to a first area.

FIG. 7 shows a method of correcting the first area shown in FIG. 5. The known density values of the indicating segments bracketing the first area are "0" and "42". The actually measured density values, which are in a range from "−3" to "40", are corrected to a range from "0" to "42". The corrected value $A_{11}$ is found using interpolation equation (1):

$$A_{11} = 0 + \frac{42 - 0}{40 - (-3)} \times (\text{density value} - (-3)) \quad (1)$$

If the density value of multiple value picture image data for an original sheet is "40", the value is corrected to the density value "42". If the density value for the picture image data is "−3", the value is corrected to "0". An intermediate density value for multiple value picture image data, for example "10", is corrected using equation (1) to 12.69 and rounding to the nearest integer "13". Fractions of 0.5 and over are rounded up.

Figure 8:
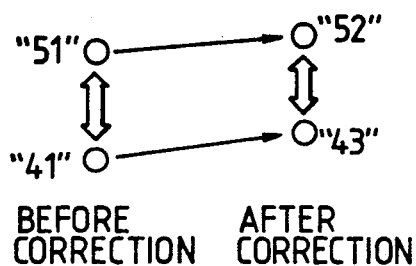
FIG. 8 is a chart illustrating the correction in respect to a second area.

FIG. 8 illustrates a method for correcting the second area. The known density values of the density indicating segments bracketing the second area are "43" and "52". The actually measured density values ranging from "41" to "51" are corrected to a range from "43" to "52". The corrected value $A_{12}$ is calculated using interpolation equation (2):

$$A_{12} = 43 + \frac{52 - 43}{51 - 41} \times (\text{density value} - 41) \quad (2)$$
$$= 0.9 \times \text{density value} + 6.1$$

If the actually measured density value is "44", the corrected value $A_{12}$ is 45.7 which is rounded to the nearest integer "46" with fractions of 0.5 and over rounded upward.

Figure 9:
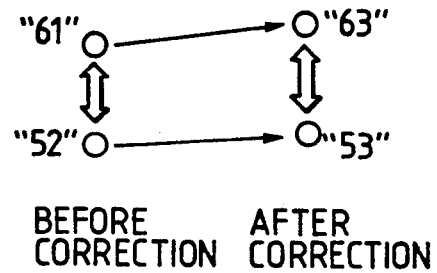
FIG. 9 is a chart illustrating the correction in respect to a third area.

FIG. 9 illustrates a method of correcting the third area. The known density values of the indicating density segments bracketing the third area are "53" and "63". The corrected value $A_{12}$ is found using interpolation equation (3):

$$A_{13} = 53 + \frac{63 - 53}{61 - 52} \times (\text{signal level} - 52) \quad (3)$$

Figure 10:
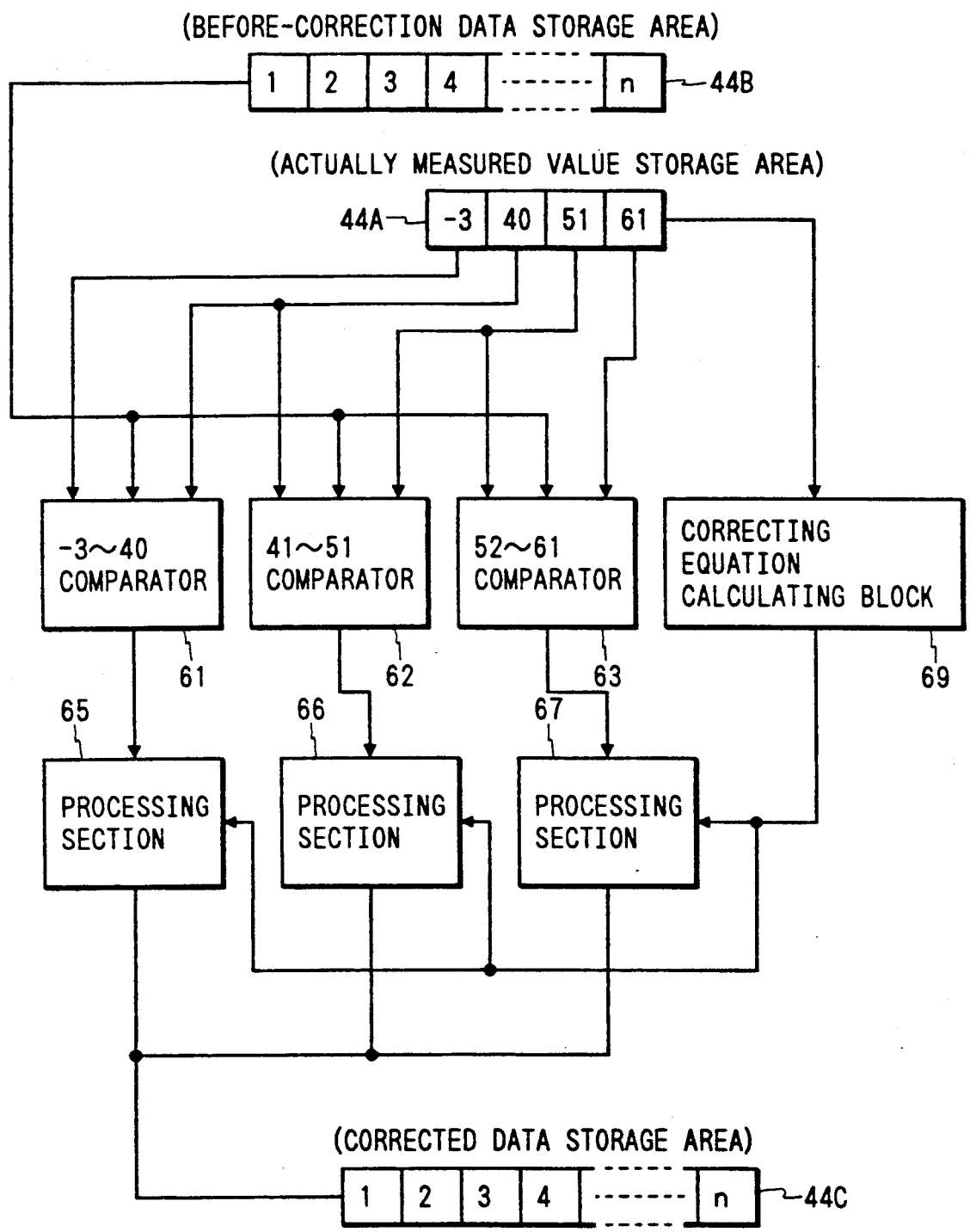
FIG. 10 is a schematic diagram of a circuit for correcting multiple value image data.

FIG. 10 is a schematic view of a multiple value picture image data correcting device.

The multiple value image input device includes first, second and third comparators 61-63. The data for one line is stored in the before-correction data storage area 44B of the RAM 44. The data is read out in the regular order, and fed to the comparator 61-63.

The first, second and third comparators 61-63 correspond to the first, second and third areas. First, second and third processing sections 65 through 67 are connected to the respective outputs of first, second and third comparators 61-63. Comparators 61-63 receive the actually measured values from the actually measured value storage area 44A. The range of each comparator 61-63 is set based upon the actually measured values corresponding to the first, second and third areas. Comparators 61-63 compare the density values of the multiple value picture image data. The comparator 61-63 with a range corresponding to the density value outputs the multiple value picture image data to the corresponding processing section. For example, if an uncorrected multiple value picture image pixel data with a density value "10" is output from the before-correction data storage area 44B, only the first comparator 61 will be turned on, and the comparator 61 feeds the multiple value picture image data to the first processing section 65.

The first, second, and third processing sections 65-67 are loaded with correcting equations stored in a correcting equation calculating block 69. The correcting equation calculating block 69 obtains the four ranges of actually measured values selected by the density indicating segment selecting switch 35 from the actually measured value storage area 44A, and performs arithmetic operations with the equations (1) through (3). Equation (1) is loaded, as a correcting equation, into the first processing section 65, and equation (2) and equation (3) are loaded, as correcting equations, into the second and third processing sections 66 and 67. The first, second, and third processing sections 65-67 substitute the density values of the multiple value picture image data for the "density values" from the correcting equations, and store the corrected density values in the memory areas allocated respectively to the relevant pixels in the corrected data storage area 44C.

For example, a multiple value picture image pixel with a density value "10" is read from the before-correction data storage area 44B in synchronization with a clock not illustrated in the Figure. The first comparator 61 is selected, and the first processing section 65 corrects the data using equation (1), and outputs the corrected density value "13" as the value $A_{11}$. The corrected density value is written to the relevant area in the corrected data storage area 44C in synchronization with the clock. The first, second, and third comparators 61-63 selectively output the multiple value picture image data in synchronization with the clock. The corrected values are found in the first, second, and third processing sections 65-67 and stored in the corrected data storage area 44C.

The processing operations are repeated for each line, and the corrected multiple value picture image data is fed out from the image data output circuit 49 to the cable 34. The data stored in the before-correction data storage area 44B is replaced in a regular sequence. If a second original sheet is set the density reference plate 26 is read again so that the second original is read after corrections have been made for changes taking place over time.

The correcting process for each line has been described with reference to the circuit illustrated in FIG. 10. However, the process can be performed with a software program stored in the ROM 43 (FIG. 1).

Thus, the multiple value image input device according to the first preferred embodiment selects any desired one or any plural number of density indicating segments out of a plural number of density indicating segments using the density indicating segment selecting switch. Only those density indicating segments which are necessary for density correction are put into use to simplify the arithmetic operations. The device can be built in a simple construction. The device permits artificial adjustment of the input characteristics of picture images because the density indicating segments are selected using a simple switch.

In the first preferred embodiment described above, corrections of the multiple value picture image pixels are made using two actually measured values which correspond to two known values on a density indicating segment. The two actually measured values are corrected to the known density values, and actually measured values between the two known values are corrected through linear interpolation. However, more than two actually measured values may be used, to find a density correction function passing through these values, and to correct the actually obtained picture image data by applying the function.

Figure 11:
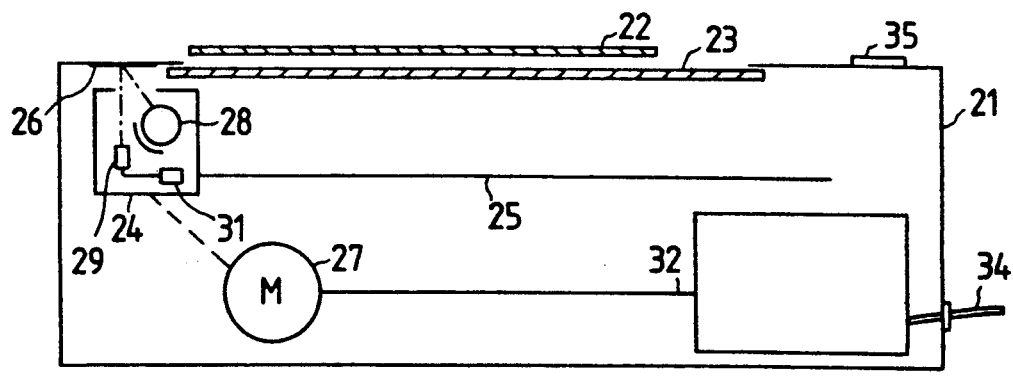
FIG. 11 is a partially schematic cutaway view of a multiple value image input device according to a second embodiment of the present invention.

FIG. 11 is a cutaway, partially schematic view of the multiple value image input device according to a second of preferred embodiment of the present invention. Similar reference characters identify parts identical to those used in the first preferred embodiment, and a description of identical parts is omitted as appropriate.

Referring to FIG. 11, the multiple value image input device in the second preferred embodiment does not have a density indicating segment selecting switch 35 as in the first preferred embodiment. The second preferred embodiment, automatically select the desired density indicating segments so that a selecting switch is not needed.

Figure 12:
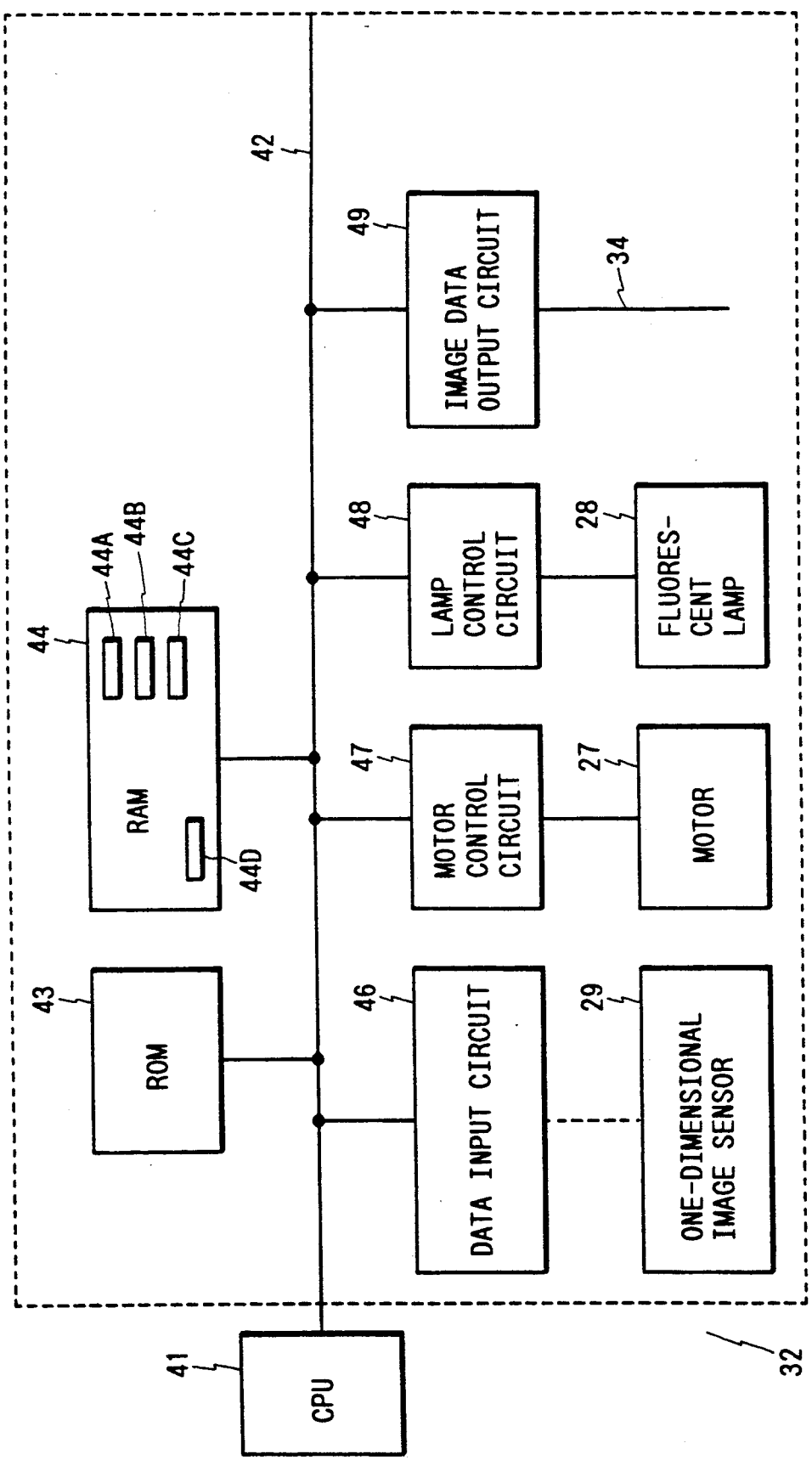
FIG. 12 is a block diagram illustrating a circuit for the multiple value image input device shown in FIG. 11.

FIG. 12 is a diagram of a circuit control block 32 according to the second preferred embodiment. A central processing unit (CPU) 41 is provided in the electronic circuit block 32. While the basic construction of the device is the same as that of the multiple value image input device in the first preferred embodiment, a density indicating segment selecting switch 35 is not provided, and the ROM 43 stores a program for the automatic selection of density indicating segments. The original sheet 22 is prescanned to obtain data for the automatic selection of the density indicating segments. The motor 47 moves the scanner 24 in prescanning operation at a lower resolution. For example, the multiple value image input device according to the second preferred embodiment reads the original sheet at a resolution of 75 dpi (dots per inch) in a prescanning operation while it reads the original sheet at a resolution of 300 dpi in the normal scanning operation.

The RAM 44 is provided with a maximum, minimum, and medium density data storage area 44D, in addition to the actually measured value storage area 44A, the before-correction data storage area 44B, and the corrected data storage area 44C. Using the maximum, minimum, and medium density data storage area 44D, the device continually updates the current maximum value and the current minimum value of the optical density during the prescanning operation and stores in the memory area the maximum density value and the minimum density value recorded at the time of completion of the prescanning operation. The medium density of two points between the maximum and minimum values are calculated, and these values are also stored in the memory area. The device selects four density indicating segments which have the closest density levels to the four stored density values, and corrects, using the selected values, the density as described in the first preferred embodiment.

The construction of the density reference plate 26 in the second preferred embodiment is the same as that shown in FIG. 3 for the first preferred embodiment. Four density indicating segments may be sufficiently selected and any density reference plate provided with four or more density indicating segments may be used.

Figure 13:
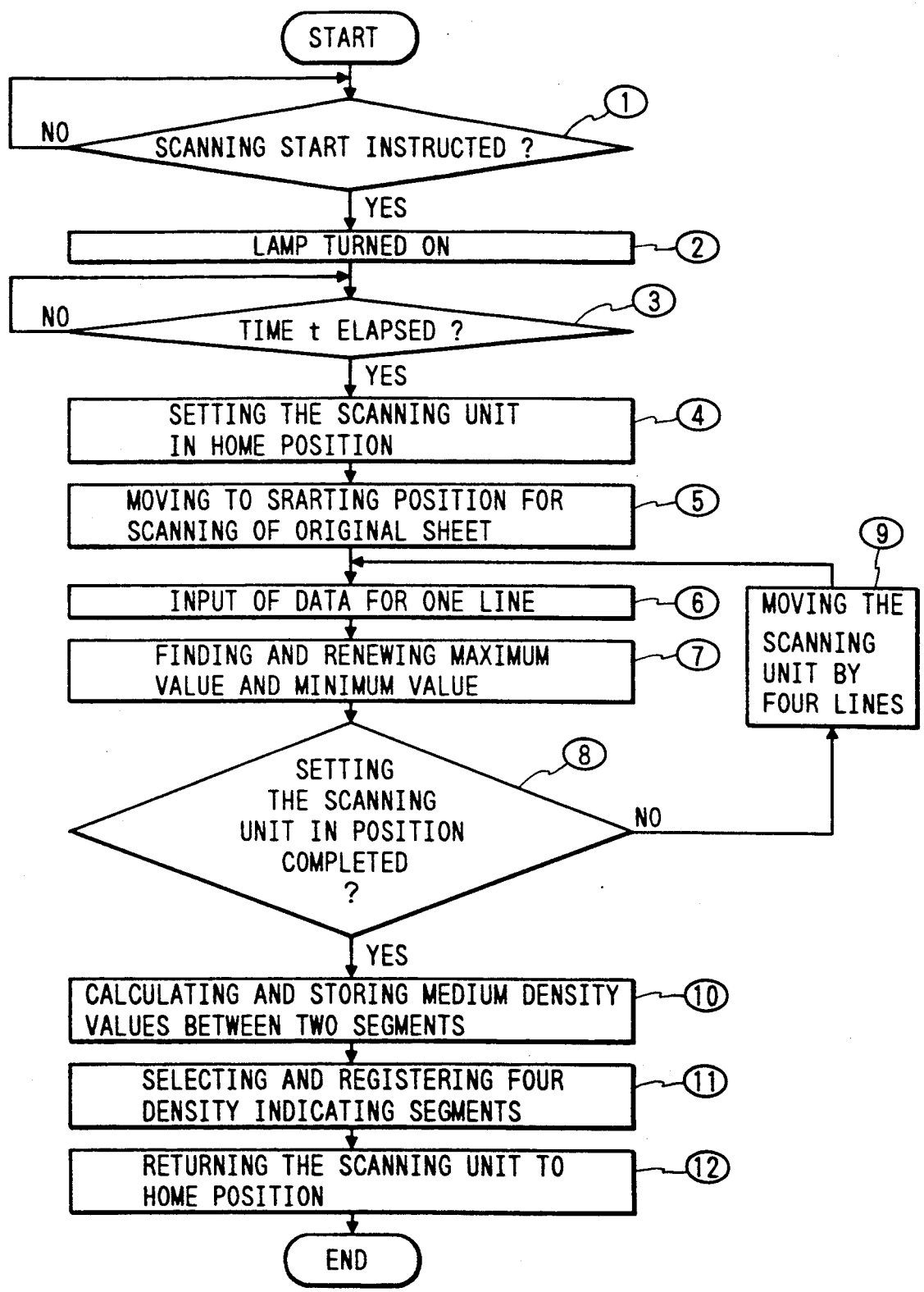
FIG. 13 is a flow chart illustrating selection of density indicating segments by prescanning.

FIG. 13 show the operations for selecting the density indicating segments by prescanning in the multiple value image input device according to the second preferred embodiment.

An instruction is issued for the start of a scanning operation in step 1 and a "Yes" is indicated. The CPU 41, shown in FIG. 12, turns on the fluorescent lamp 28 in step 2 by controlling the lamp control circuit 48. The fluorescent lamp 28 needs a period time t, approximately two to five seconds, to achieve a stable light state. In step 3, the CPU 41 measures the period of time t. Upon the elapse of the period of time t, a "Yes" is indicated, and, in step 4, the CPU 41 sets the scanner 24 in the home position.

After the scanner 24 is secured in the home position, the CPU 41, in step 5, directs the motor control circuit 47 to move the scanner 24, at a high speed, to the position for starting a scanning operation on the original sheet. Then, while the scanner 24 is set in the starting position, the multiple value image input device scans one line in step 6, and detects the maximum value and the minimum value in the one line of data for the point after the conversion of the data into multiple density values in 64 grades. The CPU 41 compares the maximum and minimum values for the one line of data with the current maximum value and the current minimum value stored in the maximum, minimum, and medium density data storage area 44D. If the CPU 41 detects a larger maximum value or a smaller minimum value in the one line of data, the CPU 41, in step 7, rewrites the current maximum value and the current minimum value to these values.

In step 8, the CPU 41 determines whether the prescanning operation has been completed on the original sheet, if the reading operation on the original sheet has not been completed, a "No" is indicated, and the CPU 41, in step 9, moves the scanner 24, at a high speed, four lines. Then, with the scanner 24 set in the new position, the CPU 41, in step 6, reads another line. Subsequently, the prescanning operation is repeated in steps 6–9 for the original sheet at a resolution of 75 dpi.

When the prescanning operation has been completed on the original sheet, a "yes" is indicated in step 8, and the maximum value and the minimum value of the density on the prescanned original sheet are stored in the maximum, minimum, and medium density data storage area 44D. The maximum and minimum values are expressed by "$D_{max}$" and "$D_{min}$", respectively. In step 10, the CPU 41 determines the two medium density values, $D_1$ and $D_2$, using equation (4) below, and stores the values in the maximum, minimum, and medium density data storage area 44D.

$$D_1 = \frac{2}{3}(D_{max} - D_{min}) + D_{min} \qquad (4)$$

$$D_2 = \frac{1}{3}(D_{max} - D_{min}) + D_{min}$$

For example, if the prescanning operation finds a maximum value $D_{max}$ of "61" and a minimum value $D_{min}$ of "3", in 64 chromatic grades, the density value of D1 will be "42" and the density value of $D_2$ will be "22".

The CPU 41 selects the four density indicating segments from the seven density indicating segments 52-58 with density values in the closest approximation to the values $D_{max}$, $D_{min}$, $D_1$, and $D_2$, and stores the selected segments.

After the values are stored in the maximum, minimum, and medium density data storage area 44D, the CPU 41, in step 12, directs the scanner 24 back to the original home position.

In one example, images of a photograph are input from a work station. A maxim $D_{max}$ found in prescanning has a density value "61", and a minimum value $D_{min}$ found in prescanning has a density value "3". If the density values in the photograph are in the state of continuum, the density correction can be acceptably made while reading such an original sheet. A prescribed number of medium density values are found on the basis of the maximum value $D_{max}$ and the minimum value $D_{min}$. However, black and white images are commonly input, and these images have density values in the range from "0" to "63", with the intermediate degrees of density between these values often appearing in some discontinuous spectra. Therefore, the optimum result will not necessarily be achieved even if the medium density values are determined by the present method. The present method may, however, be modified to solve this problem.

Figure 14:
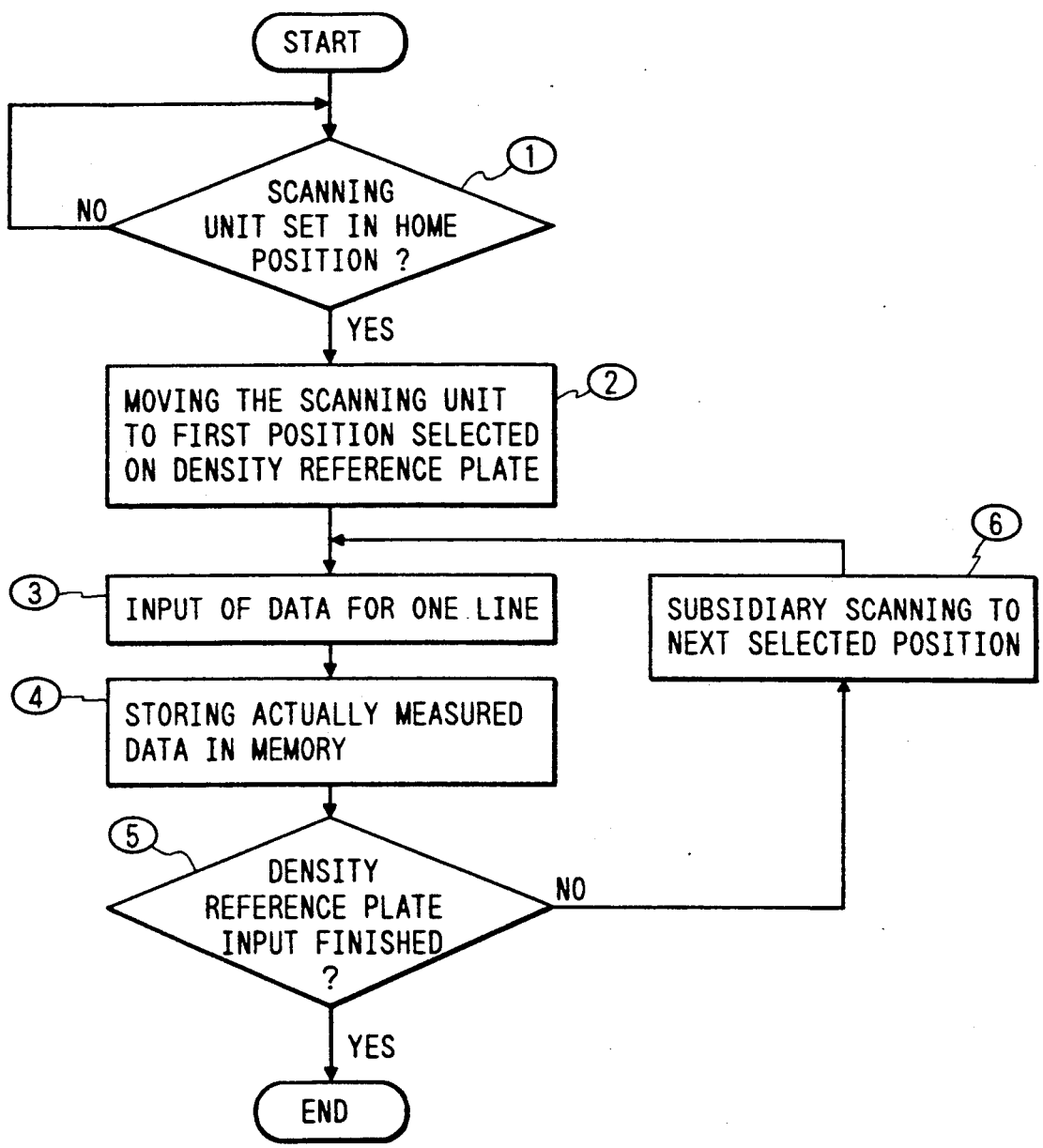
FIG. 14 is a flow chart illustrating finding measured values in the multiple value image input device after the selection of four density indicating segments.

FIG. 14 shows the operations for finding the actually measured values after the selection of four density indicating segments.

In step 1, the CPU 41 checks whether the scanner 24 has returned to the home position. If the scanner 24 has already been returned to the home position, a "Yes" is indicated, and, in step 2, the CPU 41 directs the motor control circuit 47 to move the scanner 24, in a subsidiary scanning operation, to a position exactly under the density indicating segment having the lowest degree of brightness among those density indicating segments selected on the density reference plate 26. In step 3, the multiple value image input device scans one line, and, in step 4, stores the scan data as the actually measured value for the area in the particular ink in the actually measured value stored area 44A. In step 5, the CPU 41 checks whether all the density indicating segments 52 through 56 on the density reference plate 26 have been read. If the reading operations have not been completed, a "No" is indicated, and a subsidiary scanning operation is performed for a prescribed line, in step 6, to advance the reading position to the next selected density indicating segment. The actually measured values are, thus, obtained for the remaining selected density indicating segments and the measured values are stored in the actually measured value storage area 44A. In step 5 a "Yes" is indicated, and operations to read the density reference plate 26 is completed.

In the operation described above, the density indicating segments on a plurality of lines are read at one time, and an average value of the read values for the individual lines is found. To eliminate noise components, the maximum value and the minimum value from the read values for each pixel, which is taken as the unit, are eliminated, and the average of the remaining values is calculated. The maximum and minimum value are eliminated, even though the individual density indicating segments 52-58 are read one line at a time.

Reading the original sheet and correcting the density values using the four actually measured values are the same as the corresponding operations described in the first preferred embodiment. These preferred operations are therefore omitted from the description of the second embodiment.

In the second preferred embodiment, the maximum and minimum density values for the entire area of the original sheet is found and the degree of density for the halftone range is selected taking the maximum and minimum values as the reference values. However, there are original sheets on which the density distribution differs between the upper half of the sheet and the lower half of the sheet. Such an original sheet may be divided into several areas. The maximum value and the minimum value for each of the divided areas is found, several density indicating segments for each of the areas are selected, and corrections are made on an area-by-area basis. Additionally, the number of density indicating segments used may also be changed. For example, if the upper half of an original sheet contains characters so that the density values are divided sharply between "0" and "63" while the lower half of the same sheet is composed of a photograph, the upper half will not require correction and it is sufficient to simply convert the data into binary values. The lower half will require correction, and density indicating segments will be selected.

In the first and second preferred embodiments, seven density indicating segments are arranged on the density reference plate 26. However, the types and number of density indicating segments are not limited to those described in these examples. For example, the black density indicating segment may be omitted, since the function of the black segment can be performed by turning off the light source.

The multiple value image input device according to the second preferred embodiment determines the density of the original sheet in advance by prescanning the original, and selects the necessary density indicating segments. The device can, thus, produce constant image input characteristics for the same original sheet without operator input.

The construction of the multiple value image input device according to a third preferred embodiment of the present invention is identical to that of the construction of the second preferred embodiment. Hence, a description of the overall outline of the device is omitted in this example.

Figure 15:
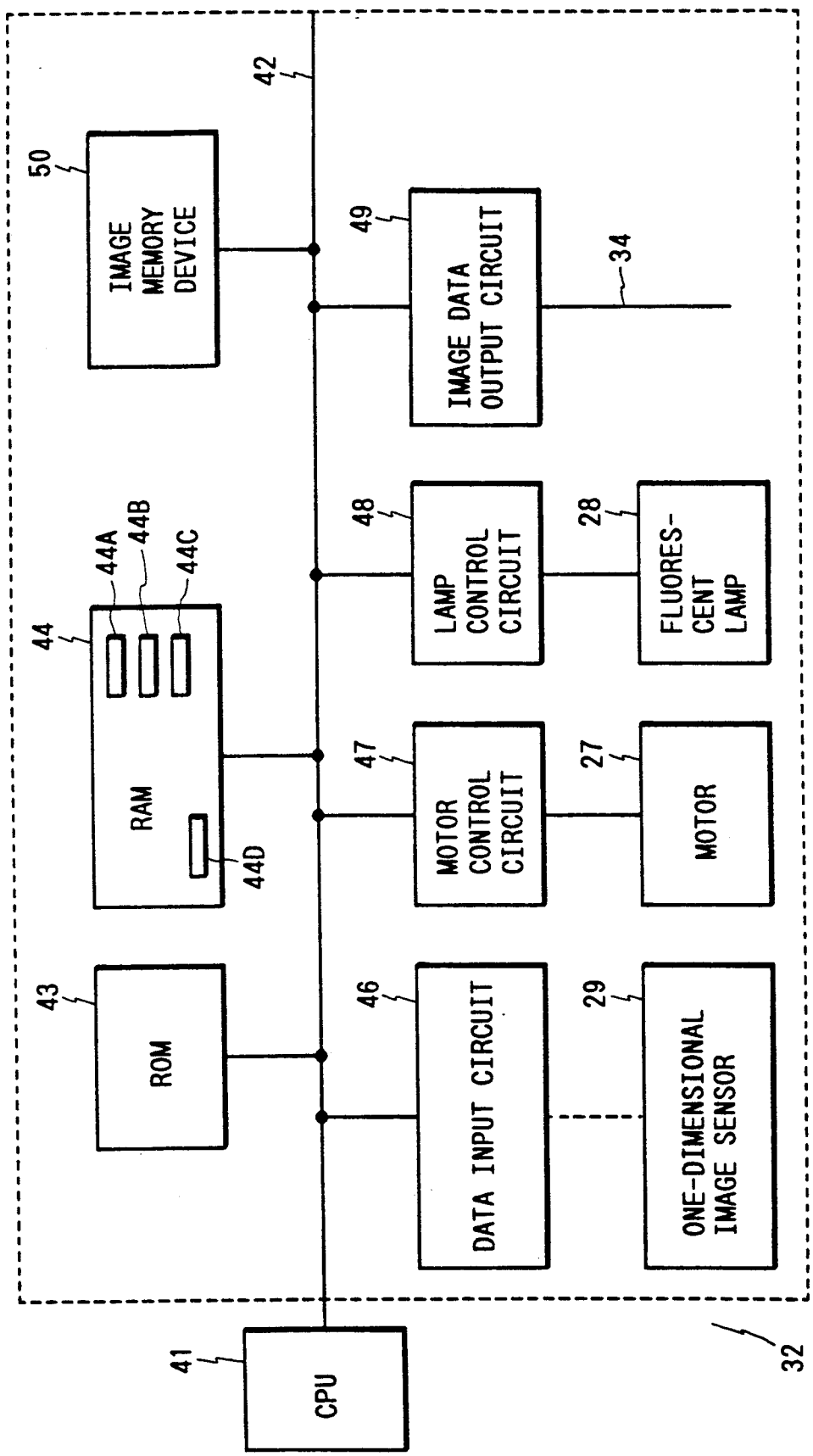
FIG. 15 is a block diagram illustrating a circuit for a multiple value image input device according to a third embodiment of the present invention.

FIG. 15 show an electronic circuit block 32 and a CPU 41 according to the third preferred embodiment. The circuit block 32 according to the third preferred embodiment is similar to the electronic circuit block in the second preferred embodiment, except that an image memory device 50 is provided in the third preferred embodiment. The image memory device 50 stores data for one page of the original sheet read by the one-dimensional image sensor 29. Because of the image memory device 50, the multiple value image input device according to the second preferred embodiment does not require prescanning to examine the density distribution.

Figure 16:
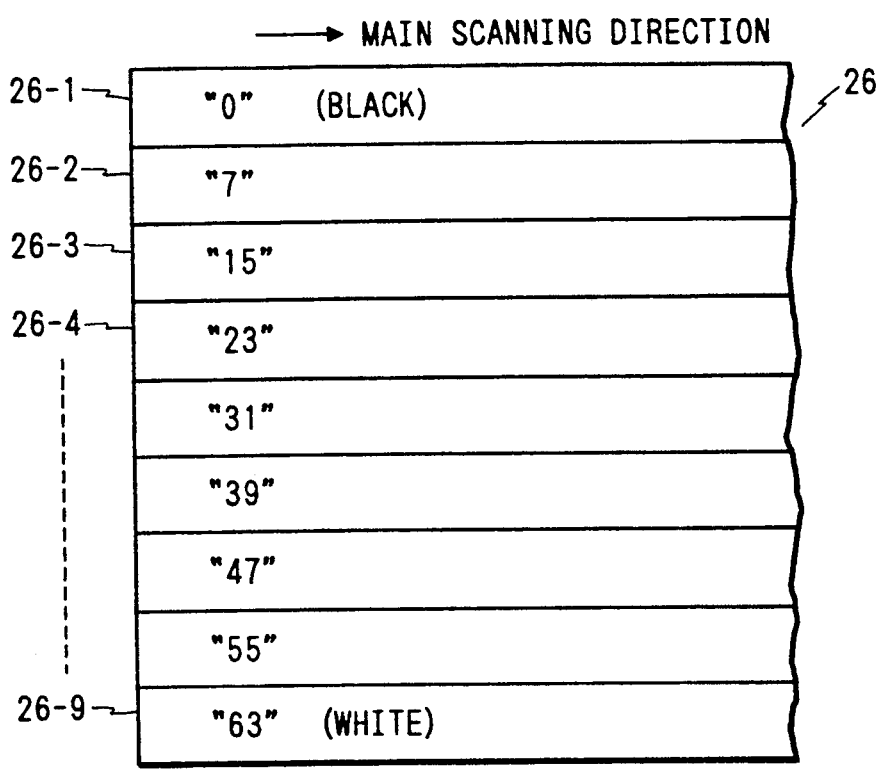
FIG. 16 is an enlarged scale plane sectional view of a density reference plate.

FIG. 16 shows a density reference plate 26 according to the third embodiment of the invention. The density reference plate 26 has nine belt shaped density indicating segments 26-1 through 6-9 arranged in parallel in the main scanning direction of the one-dimensional image sensor 29. The strip width of each density indicating segment 26-1 through 26-9 is preferably 6 mm. In this example, image density is represented in 64 chromatic grades with the density values of the individual density indicating segments progressively gaining in brightness in the order of their reference number. The optical density of the first density indicating segment 26-1 is "0" (black), while the optical density of the ninth density indicating segment 26-9 is "63" (white). The density levels of the individual density indicating segments 26-1 through 26-9 are stored as the ideal values in the ROM 43.

Figure 17:
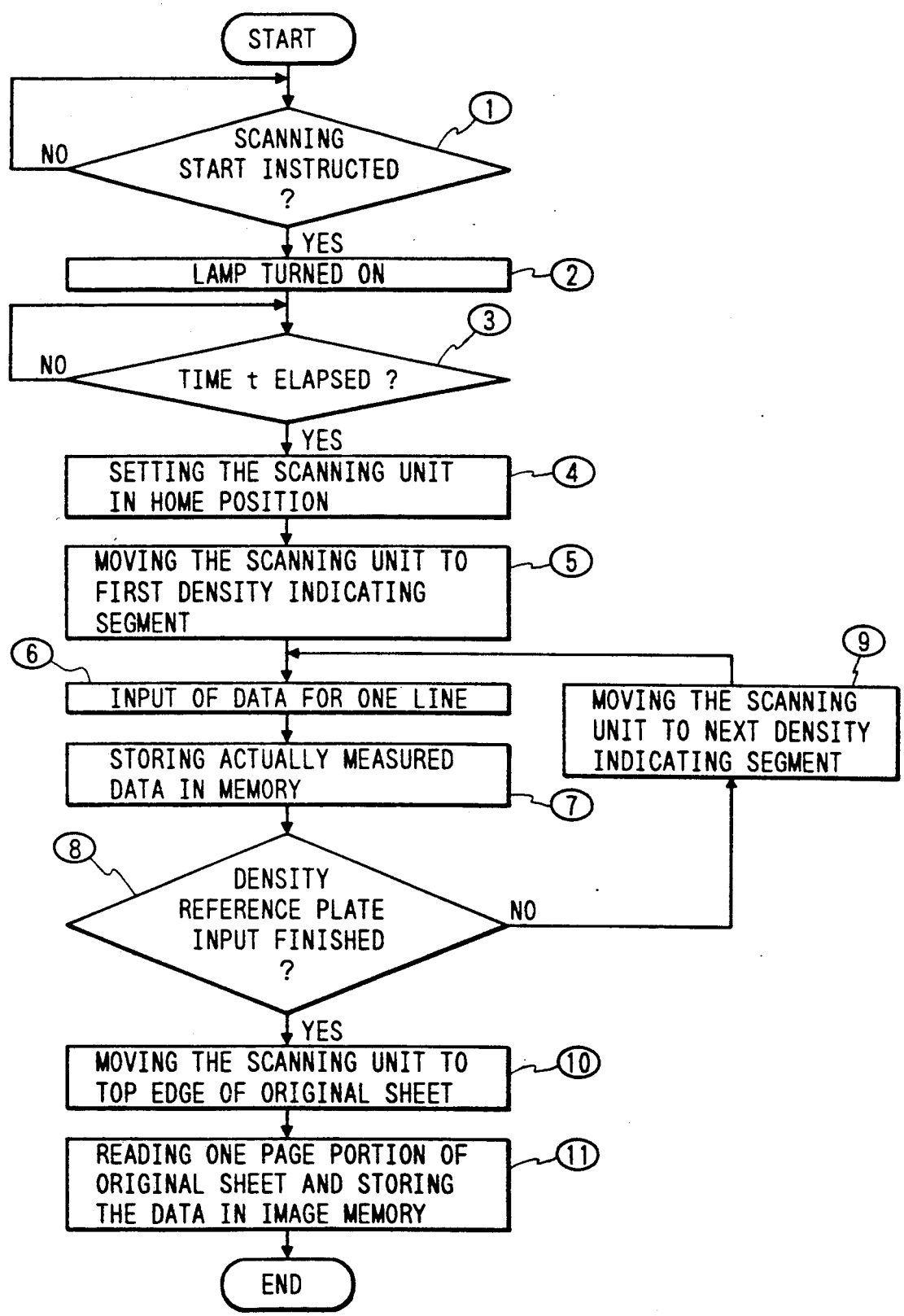
FIG. 17 is a flow chart illustrating the reading operation performed by the multiple value image input device.

FIG. 17 illustrates the operation for reading the density reference plate in a multiple value image input device according to the third embodiment of the present invention.

In step 1, an instruction is issued for the start of a scanning operation and a "Yes" is indicated. The CPU 41, shown in FIG. 15, turns on the fluorescent lamp 28 in step 2 by controlling the lamp control circuit 48. The fluorescent lamp 28 needs a period of time t, approximately two to five seconds, to achieve a stable light state. In step 3, the CPU 41 measures the period of time t. Upon the elapse of the period of time t, a "Yes" is indicated in step 4, and the CPU 41 sets the scanner 24 in the home position.

When the scanner 24 is set in the home position, the CPU 41, in step 5, directs the motor control circuit 47 to move the scanner 24, in a subsidiary scanning operation, under the first density indicating segment 26-1 set in the first position on this side of the density reference plate 26. In step 6, the multiple value image input device scans one line and, in step 7, stores the read data in the actually measured value storage area 44A as the actually measured value for the area in the particular ink. In step 8, the CPU 41 checks whether the reading operations have been completed for all the density indicating segments 26-1 through 26-9 on the density reference plate 26. If the reading operations are not yet completed, a "No" is indicated, and a subsidiary scanning operation is performed to advance the reading position to the next selected density indicating segment in step 9.

The multiple value image input device preferably reads picture images at a resolution of 400 dpi. In this example, the scanner 24 moves from the first density indicating segment 26-1 to the second density indicating segment 26-2 when it has performed its subsidiary scanning operation over a length corresponding to 94 lines. At this point in time, in step 6, the scanner 24 reads another line of data, and, in step 7, the data is stored in the actually measured value storage area 44A as the actually measured value for the particular density indicating segment.

The actually measured values are then obtained in a similar manner for the remaining selected density indicating segments 26-3 through 26-9, and the values are stored in the actually measured value storage area 44A. The reading of the density reference plate 26 is completed at this point.

When the operation for reading the density reference plate 26 is finished, a "Yes" is indicated in step 8 and, in step 10, the CPU directs the scanner 24 to the top edge of the original sheet 22. In step 11, one line of the original sheet 22 is read, and the data is converted from analog to digital and stored in the image memory device 50.

FIG. 18 illustrates one example of data stored in the memory device after the reading operation is completed by the multiple value image input device. The stored data is expressed in 64 gradation levels. The density levels of the first to ninth density indicating segments 26-1 to 26-9 are stored in the actually measured value storage area 44A. As an example, FIG. 18 only indicates the values from a few of the pixel detectors in the one-dimensional image sensor 29.

The image memory device 50 stores the density values expression in 64 gradation levels without correction.

As shown in FIG. 16, the known density value of the second density indicating segment 26-2 is "7", but the actually read density value obtained by scanning the segment 26-2 is "5". The particular pixel sensor has read the density level as darker than the actual optical density.

The known density value of the third density indicating segment 26-3, is "15", but the actually read density value obtained by scanning the segment 26-3 is "16". The density value is read at a level brighter than the actual optical density.

In this example, the maximum density value of the picture image data from a particular pixel detector is "50" and the minimum value is "10". The maximum and minimum values in the image memory device 50 are determined by checking the memory area corresponding to the particular pixel.

The multiple value image input device in the third preferred embodiment corrects the density values with four selected density indicating segments. The density indicating segments closest to the maximum value and the minimum value of the read density values comprise two of the four selected segments. In this example, the second density indicating segment 26-2 at the density value "5" is selected for the density value "10", and the eighth density indicating segment 26-8 at the density value "56" is selected for the density value "50". The density values "24" and "37" are positioned at almost equal intervals to the two density values of the selected second density indicating segment 26-2 and the selected eighth density indicating segment 26-8. The density values "24" and "37" are, thus selected. The density values of the four selected density indicating segments, are "5", "24", "37", and "56", are stored in the maximum, minimum, and medium density data storage area 44D.

Figure 19:
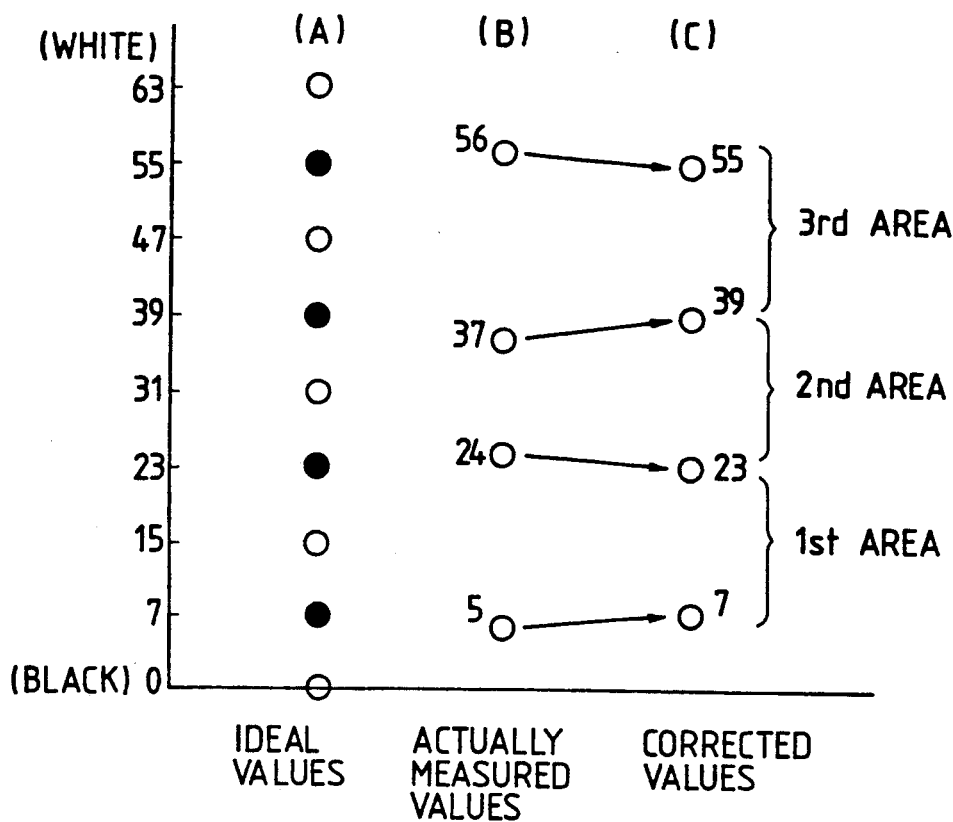
FIG. 19 is a chart illustrating a method for correcting picture image data from an original sheet.

FIG. 19 illustrates a method of correcting the actually measured values. The density of each of the density indicating segments 26-1–26-9 is shown in FIG. 19. Column (A) shows the density values or chromatic grades of the nine density indicating segments from 26-1 to 26-9 as stored in the ROM 43. The four values marked by a solid dot correspond ideally to the optical density values of the four density indicating segments 26-2, 26-4, 26-6, and 26-8 which have been selected. The five values marked by a hollow dot are the density values for the five density indicating segments 26-1, 26-3, 26-5, 26-7, and 26-9 which have not been selected.

In FIG. 19, column (B) lists the actually measured density values stored in the actually measured value storage area 44A. The actually measured values are corrected to the levels listed in column (C). For example, the actually measured density value for the second density indicating segment 26-2 is "5", while the ideal value is "7". Therefore, it is necessary to increase this value by 2 to the density value "7".

The areas between the selected density indicating segments are designated the first area, the second area, and the third area. The areas are counted beginning at the side with the color black. In this example, the individual areas have almost equal widths.

Figure 20:
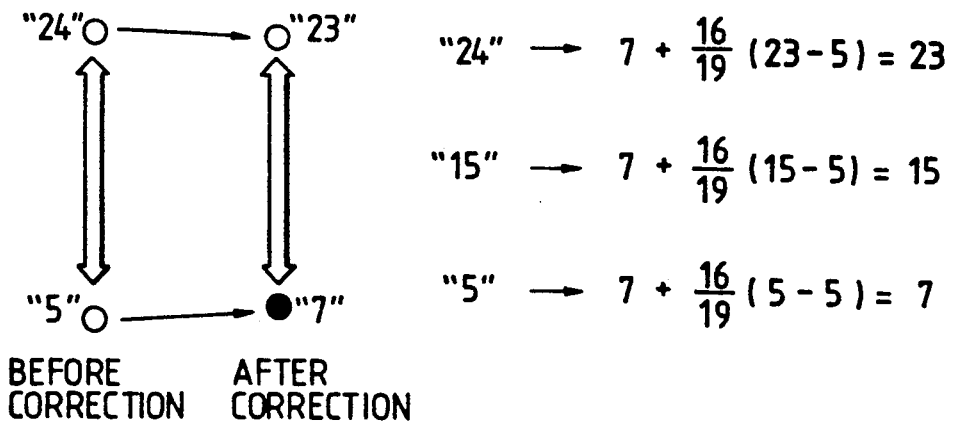
FIG. 20 is a diagram illustrating the correction with respect to a first area.

FIG. 20 shows a method of correcting the first area where the density values range from "7" to "23." The actually measured values of the density values, which are in the range from "5" to "24", are corrected to a range from "7" to "23". The corrected value $A_{31}$ is found by the following interpolation equation (5):

$$A_{31} = 7 + \frac{23-7}{24-5} \times (\text{density value} - 5) \qquad (5)$$

If the actually read density value of the multiple value picture image data is "24", the value is corrected to the ideal density value "23" as shown in FIG. 20. If the actually read density value for the picture image data is "5", the value is corrected to the ideal density value "7". If the actually read density value is "15", an intermediate value the value is corrected to 15.36 using the fifth interpolation equation. The density value "15" is obtained by rounding 15.36 to the nearest integer with fractions of 0.5 and over rounded upward.

FIG. 21 illustrates a method of correcting the second area with density values ranging from "24" to "39". The actually measured density value in the range from "25" to "37" are corrected to density values in a range from "24 " to "39." The corrected value $A_{32}$ is calculated using interpolation equation (6):

$$\begin{aligned}A_{32} &= 24 + \frac{39-24}{37-25} \times (\text{density value} - 25) \qquad (6)\\ &= 1.25 \times \text{density value} - 7.25\end{aligned}$$

If the actually measured density value is "35" the corrected value $A_{32}$ is 36.5, which is rounded to the nearest integer with fractions of 0.5 and over rounded upward.

FIG. 22 illustrates a method of correcting the third area in which the density values range from "40" to "55". The corrected value $A_{33}$ is found using interpolation equation (7):

$$A_{33} = 40 + \frac{55-40}{56-38} \times (\text{density value} - 38) \qquad (7)$$

Figure 23:
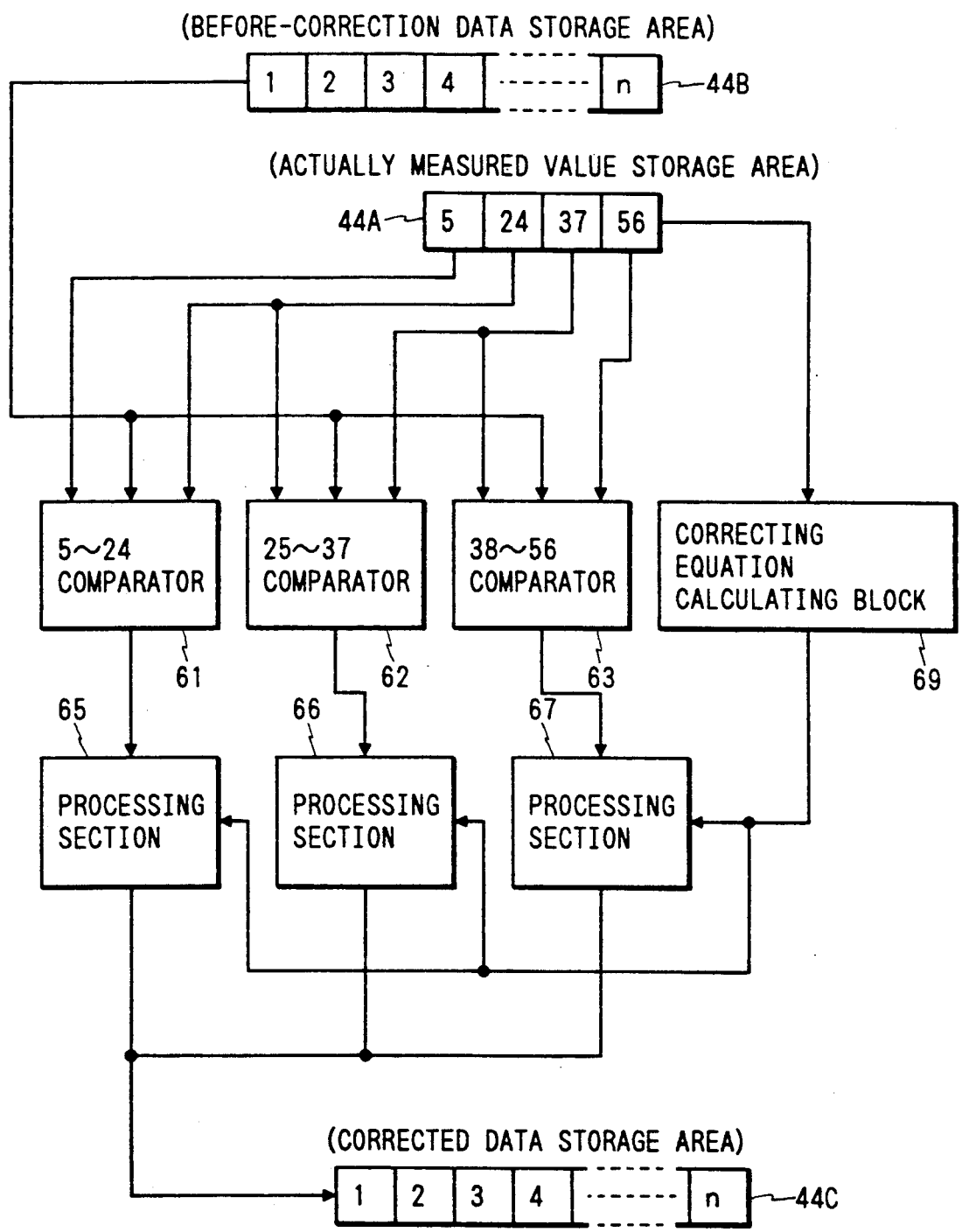
FIG. 23 is a schematic diagram of a circuit for correcting multiple value picture image data.

FIG. 23 is a schematic illustration of a method and device for correcting the multiple value picture image data obtained from reading an original sheet. The elements shown in FIG. 23 are substantially the same as the elements shown in FIG. 10 for the first preferred embodiment. Accordingly, the circuit construction is omitted from the description.

Referring to FIG. 23, the yet uncorrected multiple value picture image data at the density value "15" is output from the before-correction data storage area 44B. Only the first comparator 61 is turned on and first comparator 61 feeds the multiple value picture image data to the first processing section 65.

The first processing section 65 corrects the data using interpolation equation (5), and outputs the density value "15" as the corrected value $A_{31}$. The corrected value is written to the relevant area in the corrected data storage area 44C in synchronization with a clock not shown in the Figure. The first, second, and third comparators 61-63 selectively output the multiple value picture image data in synchronization with the clock. The first, second, and third processing sections 65-67 determined the corrected values, and the corrected data storage area 44C, stores the corrected values. The correcting operation is repeated for each line, and the corrected multiple value picture image data is fed out from the image data output circuit 49 to the cable 34.

In one example, images of a photograph are input from a workstation. In the image memory device 50, the maximum density value is "50" and the minimum density value is "10." The density in a photograph is a continuum in many instances. An acceptable density correction can be made when a reading operation is performed on such a photograph with a prescribed number of medium density values selected on the basis of the maximum and the minimum density values.

However, if mainly black and white images are input, the density values will be in the range from "0" to "63" with the density levels between "0" and "63" often appearing in some discontinuous spectra. An acceptable correction will not be achieved using the method described above. To achieve a better result, the method of determining the medium density values is modified through arithmetic operations.

In the third preferred embodiment, the maximum density value and the minimum density value over the entire length of the original sheet in the subsidiary scanning direction is determined. The degrees of density for the halftone range are selected using the maximum and minimum values as reference values.

Some original sheets have different density distribution on the upper half of the sheet and the lower half of the sheet. The original sheet is divided into several areas. The maximum density value and the minimum density value for each of the divided areas is found and several density indicating segments are selected for each of the areas. The corrections are then made on an area-byarea basis.

The number of density indicating segments used may also be changed. For example, the upper half of an original sheet contains characters while the lower half of the same sheet contains a photograph. The density values in the upper half are divided sharply between "0" and "63" so that the may simply be converted into binary values. The date from the lower half is corrected, and four density indicating segments are selected.

The multiple value image input device in the third preferred embodiment has a density reference plate 26 with individual density indicating segments arranged in adjacent positions as shown in FIG. 16. The density indicating segments 52-58 may also be printed with a width d at prescribed intervals in the main scanning direction on a density printing plate 51 in a white color or the like as illustrated in FIG. 3. In the example shown in FIG. 3, the density printing plate 51 has seven density indicating segments 52-58 set at different degrees of optical density. The density indicating segments according to the present invention are not limited to this arrangement. The density indicating segments may have nine or more segments as in the third preferred embodiment.

In the third preferred embodiment, the maximum density value and the minimum density value are determined after the image data is stored in the image memory device, but it is also possible to obtain the maximum value and the minimum value by using the picture image data written to the image memory device.

In the third preferred embodiment, an image memory device temporarily stores the picture image data for one page of the original sheet. A prescanning operation is therefore not required to check the distribution of density on the original sheet. Hence, high speed corrections of picture image data are made.

Figure 24:
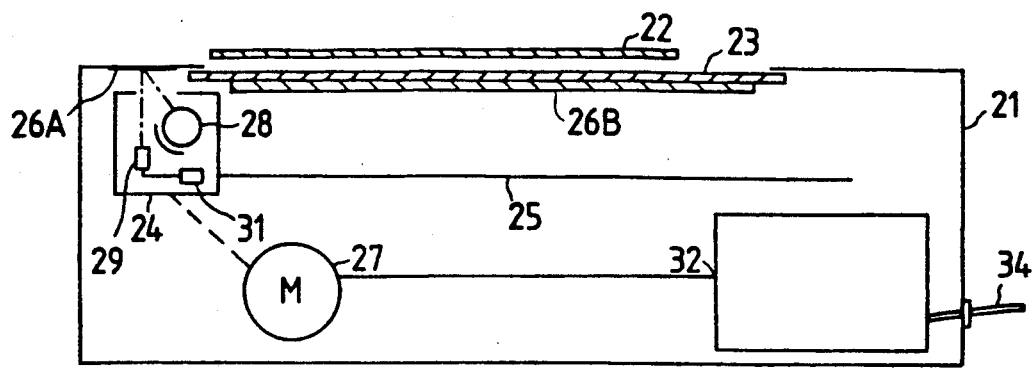
FIG. 24 is a partially schematic cutaway view of a multiple value image input device according to a fourth embodiment of the present invention.

FIG. 24 is a cutaway partially schematic view of a multiple value image input device according to a fourth preferred embodiment of the present invention. Similar parts to other figures are marked with similar reference numbers. A description of parts already discussed is omitted.

The multiple value image input device according to the fourth preferred embodiment has two density reference plates. A first density reference plate 26A is arranged on the back face of the upper panel of the main unit adjacent to the end of the platen glass 23 from which the scanning operation is started. A second density reference plate 26B in the shape of a strip is arranged along one side of the back face of the platen glass 23.

In this example, the electronic circuit block 32 is identical to the same circuit block 32 shown in FIG. 12 for the second preferred embodiment.

Figure 25:
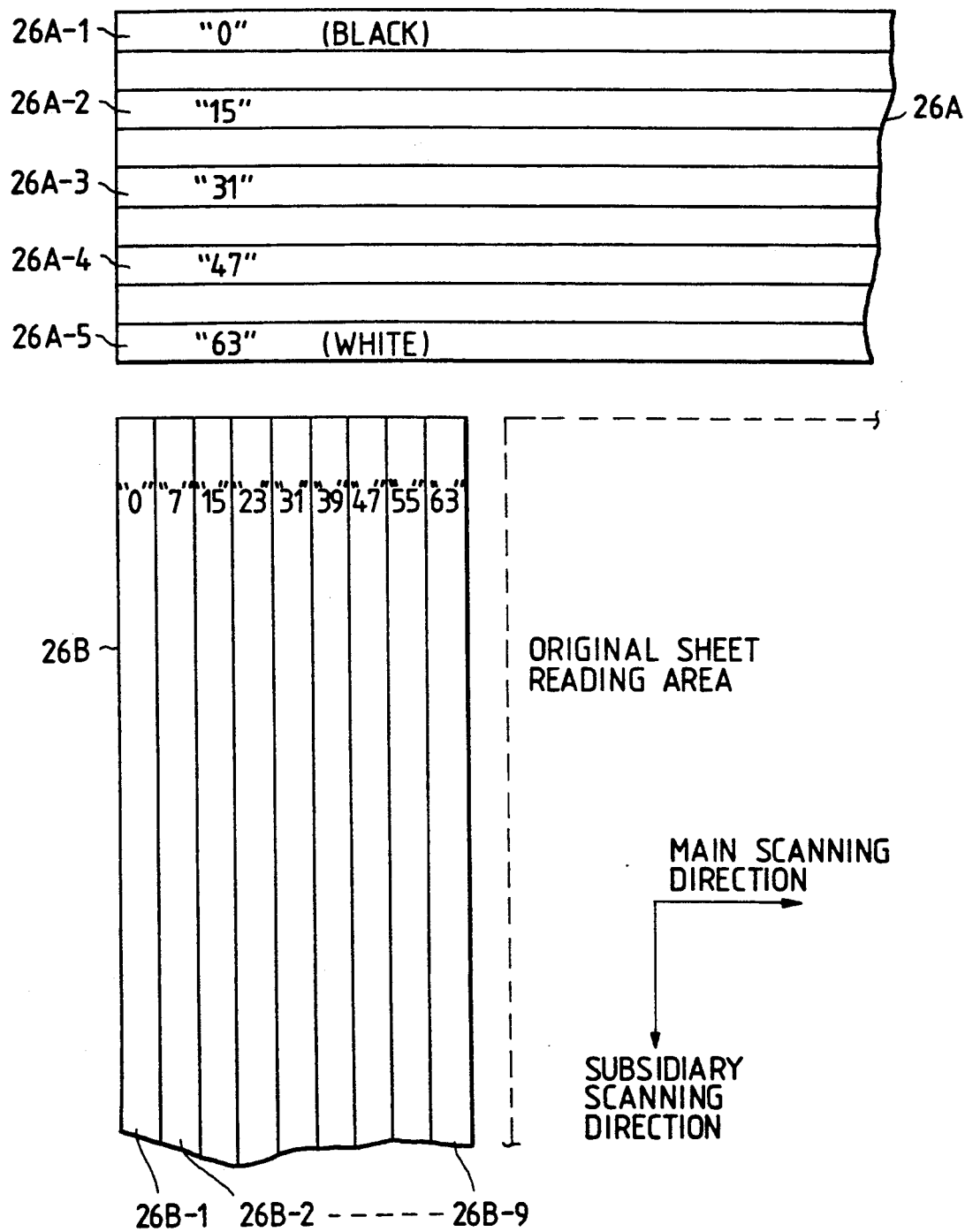
FIG. 25 is an enlarged scale plane view of a section of a first density reference plate and a section of a second density reference plate according to the fourth embodiment.

FIG. 25 illustrates on an enlarged scale a part of the first density reference plate 26A and the a part of second density reference plate 26B.

Figure 26:
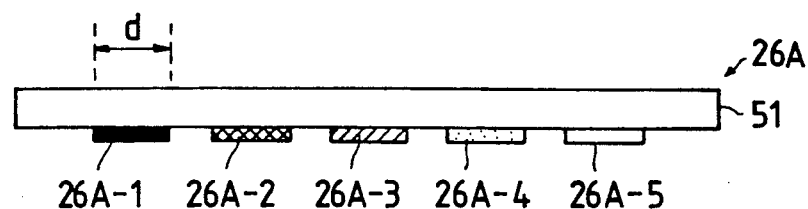
FIG. 26 is a side view of the first density reference plate according to the fourth embodiment.

The first density reference plate 26A, with five strip-shaped density indicating segments 26A-1 to 26A-5, is arranged in parallel at prescribed intervals in the main scanning direction of the one-dimensional image sensor 29. FIG. 26 is a side view of the first density reference plate 26A. The density reference plate 26A is formed by printing five narrow strip-shaped density indicating segments 26A-1 to 26A-5 on a plastic substrate 51. The strip width d of each of the density indicating segments is 4 mm, and a clearance of 2 mm is provided between the individual strips. The first density indicating segment 26A-1 is printed in black ink, and the second density indicating segment 26A-2 is printed in relatively dark gray ink. The third density indicating segment 26A-3 is printed in medium-tone gray ink, and the fourth density indicating segment 26A-4 is printed in relatively bright gray ink. The fifth density indicating segments 26A-5 is printed in white ink. The optical density levels of the first to fifth density indicating segments 26A-1 to 26A-5 are "0", "15", "31", "47", and "63", respectively. The density values are expressed in 64 chromatic grades. The known density values of the density indicating segments are stored in the ROM 43 as ideal values.

The second density reference plate 26B is arranged in the subsidiary scanning direction of the one-dimensional image sensor 29, and has nine density indicating segments 26B-1 through 26B-9 in the form of narrow 2 mm strips. The optical density of the first density indicating segment 26B-1 is "0" (black), and the other density indicating segments have optical density values in a progressive scale of brightness. The ninth density indicating segment 26B-9 has the optical density value of "63" (white). The density levels for the segments are stored in the ROM 43 as the ideal values.

The multiple value image input device in this example accepts picture images on an original sheet in A-3 size. An A-3 original sheet has a length of 297 mm in the main scanning direction. When an A-3 original sheet is read at the density of 400 dpi, a total of approximately 4,677 pixel detectors will be needed. The one-dimensional image sensor 29 has a reading element unit composed of 5,000 pixel detectors. Approximately 38 pixel detectors correspond to each of the individual density indicating segments 26B-1 through 26B-9. The second density reference plate 26B is set in an area other than the reading area for the original sheet. Longer one-dimensional image sensor is used for operation in the main scanning direction, it is also possible to broaden the width of the second density reference plate 26B. Moreover, it is possible to increase or decrease the number of density indicating segments freely on the second density reference plate 26B.

Measurement of the first density reference plate 26A and a method of correction will no be described.

The multiple value image input device corrects the density values of the individual pixels in the main scanning direction by reading the first density reference plate 26A. The density levels of the picture image data on the particular line is corrected by reading the second density reference plate 26B.

Figure 27:
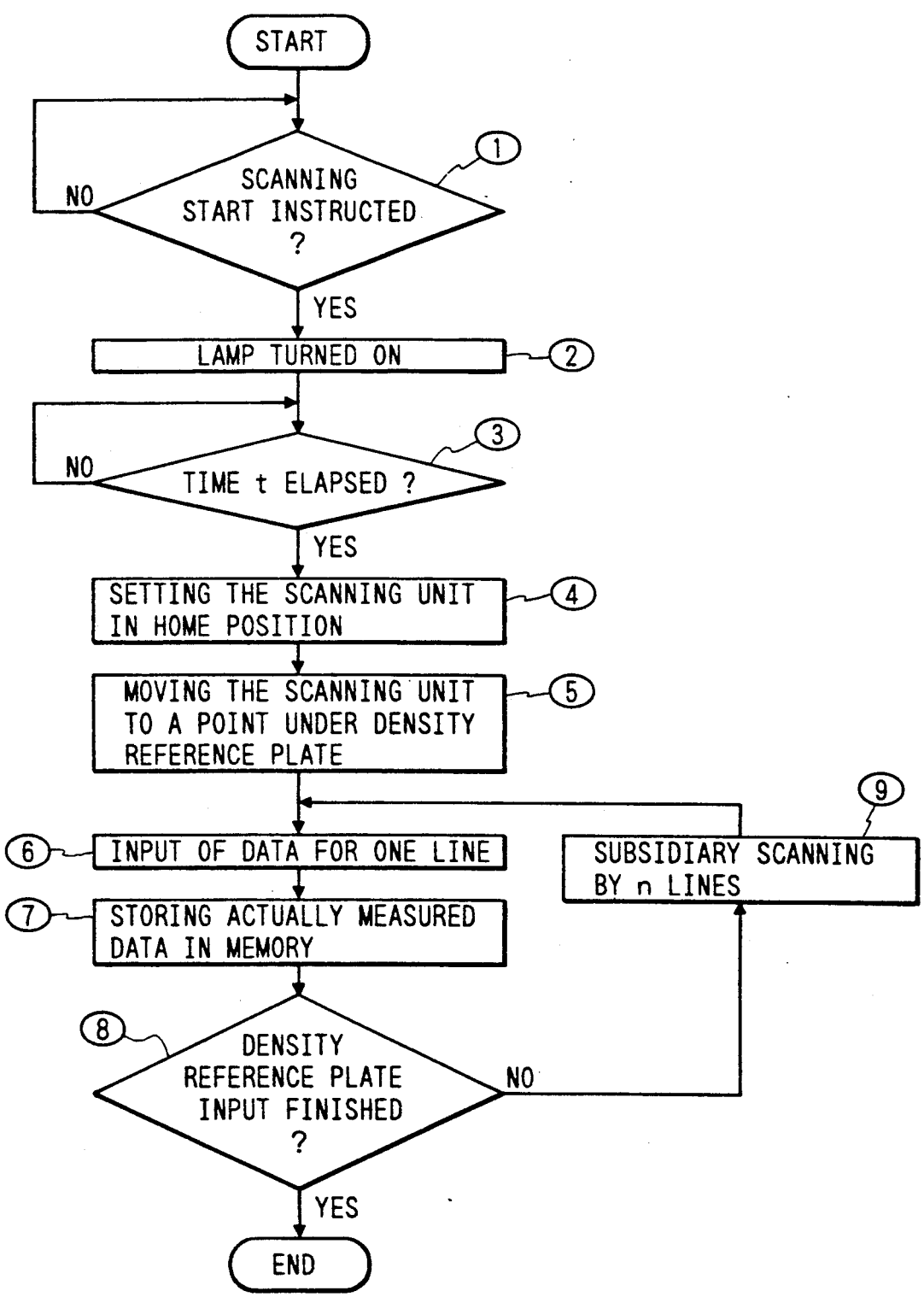
FIG. 27 is a flow chart of the operations performed for reading the first density reference plate according to the fourth embodiment.

FIG. 27 illustrates an outline of the operations for reading the first density reference plate 26A.

An instruction is issues for the start of a scanning operation, and a "Yes" is indicated. The CPU 41 turns on the fluorescent lamp 28 by controlling the lamp control circuit 48. The fluorescent lamp 28 needs a period of time t, approximately two to five seconds, to achieve a stable light state. In step 3, the CPU 41 measures the period of time t. Upon the elapse of the period of time t, a "Yes" is indicated and in step 4, the CPU 41 moves the scanner 24 to the home position. Normally, the scanner 24 is returned to the home position after the original sheet is read. However, if the power source is turned off or a power failure occurs during the reading, the scanner 24 will be stopped at a point other than the home position. Hence, whether the scanner 24 is in the home position is checked using a sensor not illustrated in the Figure.

When the scanner 24 is set in the home position, the CPU 41, in step 5, directs the motor control circuit 47 to move the scanner 24, in a subsidiary scanning operation, under the density indicating segment 26A-1 of the first density reference plate 26A. In step 5, the multiple value image input device then reads data for one line, and, in step 7, stores the read data in the actually measured value storage area 44A as the actually measured value for the area in the particular ink. The CPU 41 checks whether the reading operation has been completed on all the density indicating segments 26A-1 through 26A-5 on the first density reference plate 26A. If the reading operation is not completed, a "No" is indicated, and, in step 9, a subsidiary scanning operation for n-lines is performed to advance the reading position to the next density indicating segment 26A-2.

In this example, the multiple value image input device has a scanning density of 400 dpi. The scanner 24 moves to approximately the center of the second density indicating segment 26A-2, and the scanner 24 performs a subsidiary scanning operation on 94 lines. The scanner 24, in step 6, again reads data on one line, and stores the read data in the actually measured value storage area 44A as the actually measured value for the area in ink of relatively dark gray color.

Repeating the above operation, the actually measured values are obtained for the remaining density indicating segments 26A-3 through 26A-5. The values are stored in the actually measured value storage area 44A in step 8, and a "Yes" is indicated. Reading the density reference plate 26A is then completed.

The individual density indicating segments 26A-1 to 26A-5 are read one line at a time. However, a plurality of lines of the density indicating segments may be read at a time, and an average of the values for the individual lines calculated. To eliminate noise components, the maximum density value and the minimum density value are eliminated from the values read by each pixel detector, and the average of the remaining values is calculated.

Figure 28:
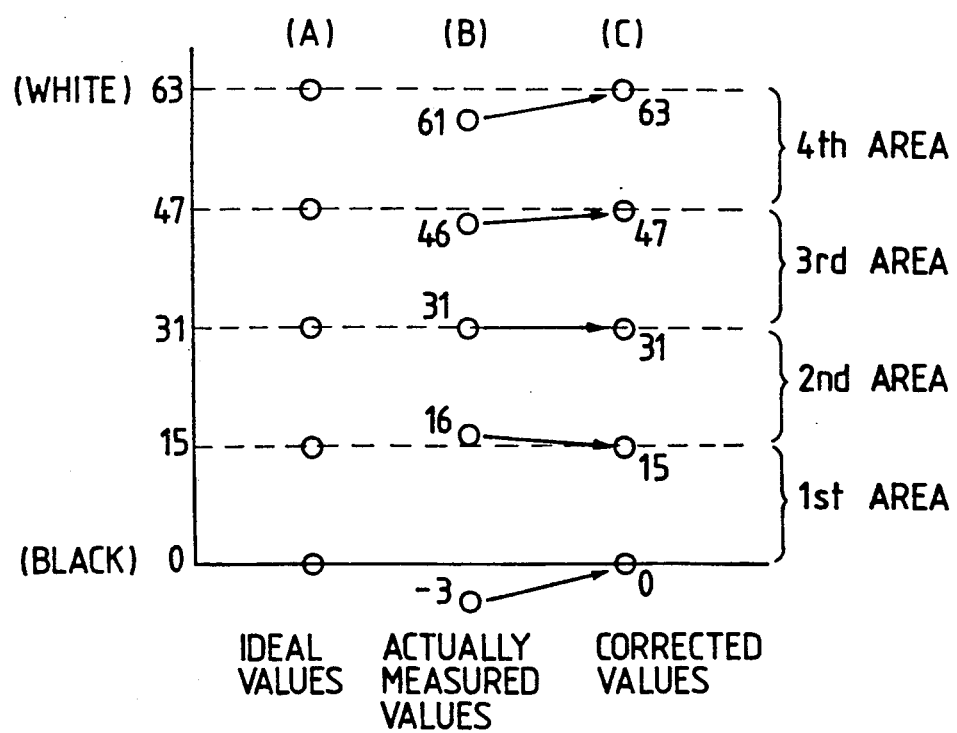
FIG. 28 is a chart illustrating values actually measured from individual density indicating segments on the first density reference plate and an outline of the density.

FIG. 28 shows an example of actually measured values for each density indicating segments 26A-1 through 26A-5. FIG. 28 also shows an outline of density. Column (A) lists the ideal values from the five density indicating segments 26A-1 to 26A-5. The density value of the five density indicating segments 26A-1 through 26A-5 range from black to white, and are "0", "15", "31", "47", and "63". A difference of "16" density levels exists between the individual segments. In FIG. 28, column (B) lists the actually measured density values stored in the actually measured value storage area 44A.

The actually measured density value for the first density indicating segment 26A-1 is "−3". During correction the actually measured density value "−3" is increased by 3 to the ideal density value "0" as shown in column (C).

The actually measured density value for the second density indicating segment 26A-2, in dark gray is "16". During correction, the actually measured density value is reduced by 1 to the ideal density value "15".

The remaining actually measured density values are corrected using the same procedure.

In this example, the first area is between the known density values "0" and "15", and the second area is between the known density values "15" and "31". The third area is between the known density values "31" and "47", and the fourth area is between the known density values "47" and "63". Each area has a range of 16 density values.

Figure 29:
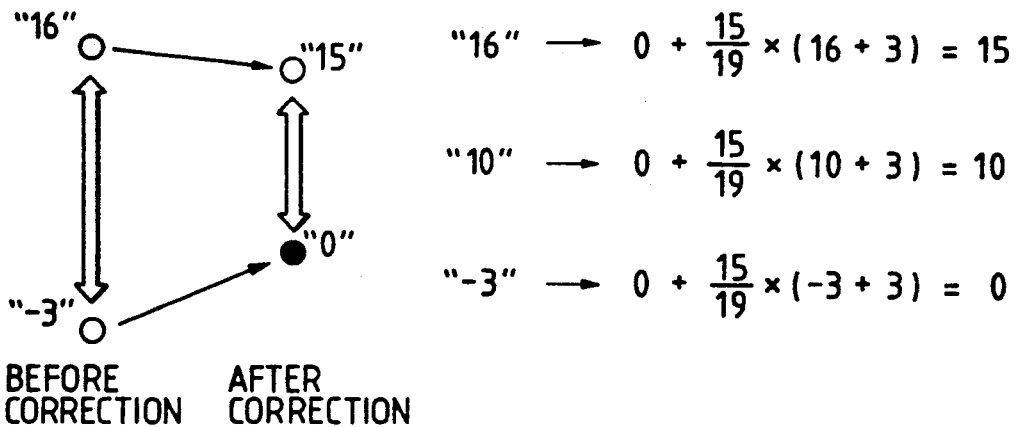
FIG. 29 is a diagram illustrating the correction with respect to a first area.

FIG. 29 shows a method of correcting the first area with density values from "0" to "15". The actually measured density values are in the range from "−3" to "16". The actually measured density values are corrected to a range from "0" to "15". The corrected value $A_{41}$ is calculated using interpolation equation (8):

$$A_{41} = 0 + \frac{15 - 0}{16 - (-3)} \times (\text{density value} - (-3)) \quad (8)$$

The actually measured density value "16" is corrected to the ideal density value "15" as shown in FIG. 29. The actually measured density value "−3" is corrected to the ideal density value "0". An intermediate actually measured density value "10" is corrected to 10.26 using interpolation equation (8), and the density value "10" is obtained by rounding to the nearest integer with fractions of 0.5 and over rounded upward.

Figure 30:
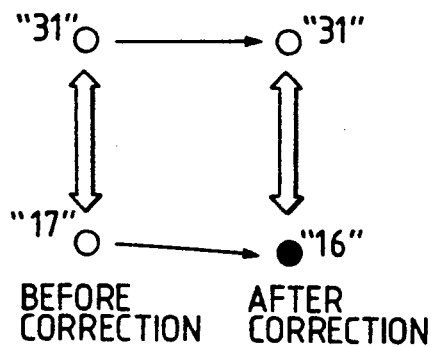
FIG. 30 is a diagram illustrating the correction with respect to a second area.

FIG. 30 shows a method of correcting the second area with density values ranging from "16" to "31". The actually measured density values "17" to "31" are corrected to density values from "16" to "31". The corrected value $A_{42}$ is calculated using interpolation equation (9):

$$A_{42} = 16 + \frac{31 - 16}{31 - 17} \times (\text{density value} - 17) \quad (9)$$
$$= 1.07 \times \text{density value} - 2.21$$

The actually measured density value "20" is corrected to 19.21, and the density value "19" is obtained by rounding to the nearest integer with fractions of 0.5 and over rounded upward.

Figure 31:
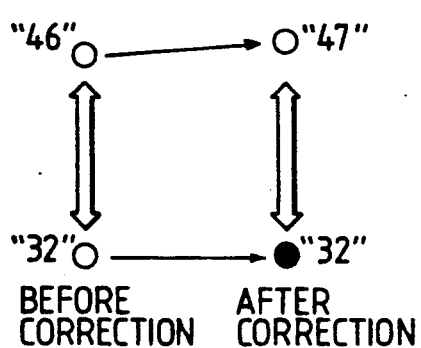
FIG. 31 is a diagram illustrating the correction with respect to a third area.

FIG. 31 shows a method of correcting the third area with density values from "32" to "47". The corrected value $A_{43}$ is calculated using interpolation equation (10):

$$A_{43} = 32 + \frac{47 - 32}{46 - 32} \times (\text{density value} - 32) \quad (10)$$

Figure 32:
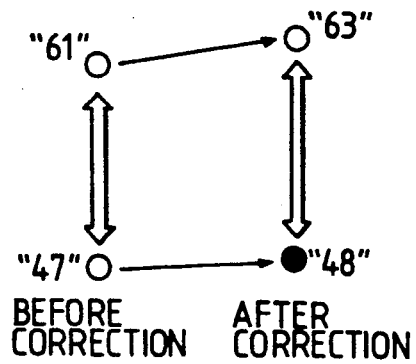
FIG. 32 is a diagram illustrating the principle of correction with respect to a fourth area.

FIG. 32 shows a method of correcting the fourth area with density values from "48" to "63". The corrected value $A_{44}$ is calculated using interpolation equation (11):

$$A_{44} = 48 + \frac{63 - 48}{61 - 47} \times (\text{density value} - 47) \quad (11)$$

The measurement of the second density reference plate 26B and a method of correction will now be described.

As shown in FIG. 25, the second density reference plate 26B has first to ninth density indicating segments 26B-1 to 26B-9. In this example of preferred embodiments, the correction of picture image data is performed for each line. Four density indicating segments are selected for each line. The selections depend upon the density distribution of the line.

Figure 33:
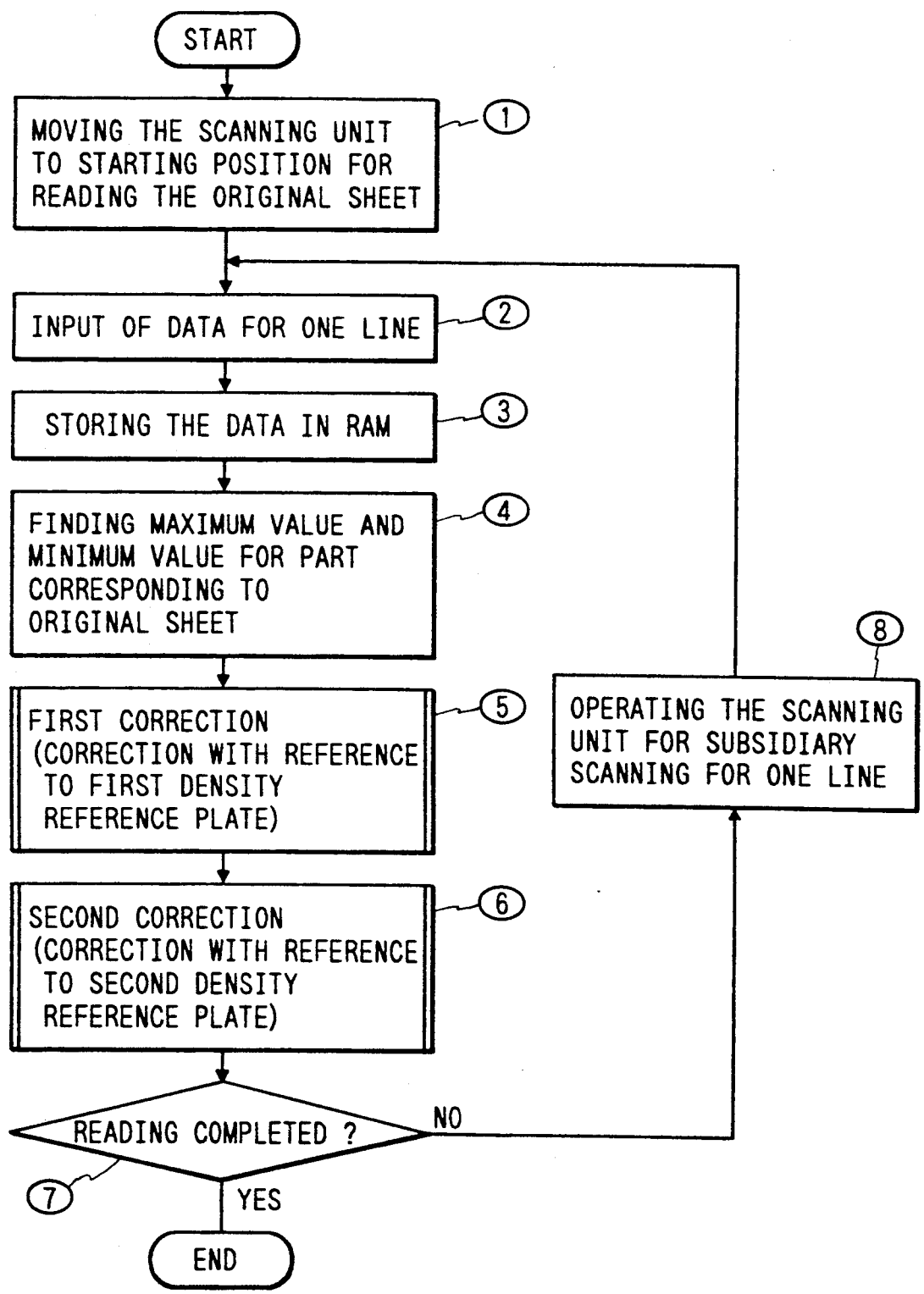
FIG. 33 is a flow chart illustrating the operations for reading an original sheet and the second density reference plate according to the fourth embodiment.

FIG. 33 shows the operations for reading the original sheet and the second density reference plate 26B. The original and the second density reference plate 26B are read after the first density reference plate 26A.

After the first density reference plate 26A is read, the CPU 41, in step 1, directs the motor control circuit 47 to move scanner 24, in a subsidiary scanning operation, to the start position for reading the original sheet. In step 2, the one-dimensional image sensor 29 reads one line of data. One line of data includes data from the original and data from the second density reference plate 26B. In step 3, the data for one line is stored in the before-correction data storage area 44B in the RAM 44 as the before-correction data. The maximum density value and the minimum density value in the picture image data for one line is determined. The maximum density value and the minimum density value are stored in another area in the RAM 44. The maximum density value and the minimum density value are used when two density indicating segments are selected from the second density reference plate 26B.

The CPU 41, in step 5, first performs the first correction of the data using the first density reference plate 26A as described above. The actual density values for the density indicating segments 26B-1 through 26B-9 on the second density reference plate 26B are corrected using the results derived from the first density reference plate 26A. The first correcting operation was described above with reference to FIGS. 28-32.

When the first correction is completed, the CPU 41, in step 6, begins the second correction using the second density reference plate 26B. One line of the original is corrected at a time.

Upon completion of the second correction of a line of data the CPU 41, in step 7, determines whether the reading of the original sheet 22 is completed. If the scanner 24 has not reached the final line of the original, a "No" is indicated and, in step 8, the CPU 41 moves the scanner 24, in a subsidiary scanning operation, to the next line to be read. Returning to step 2, the scanner 24 read one line of data. The operation is repeated to read the data on each line and make the first and second corrections until all the lines of the original sheet 22 have been read.

Figure 34:
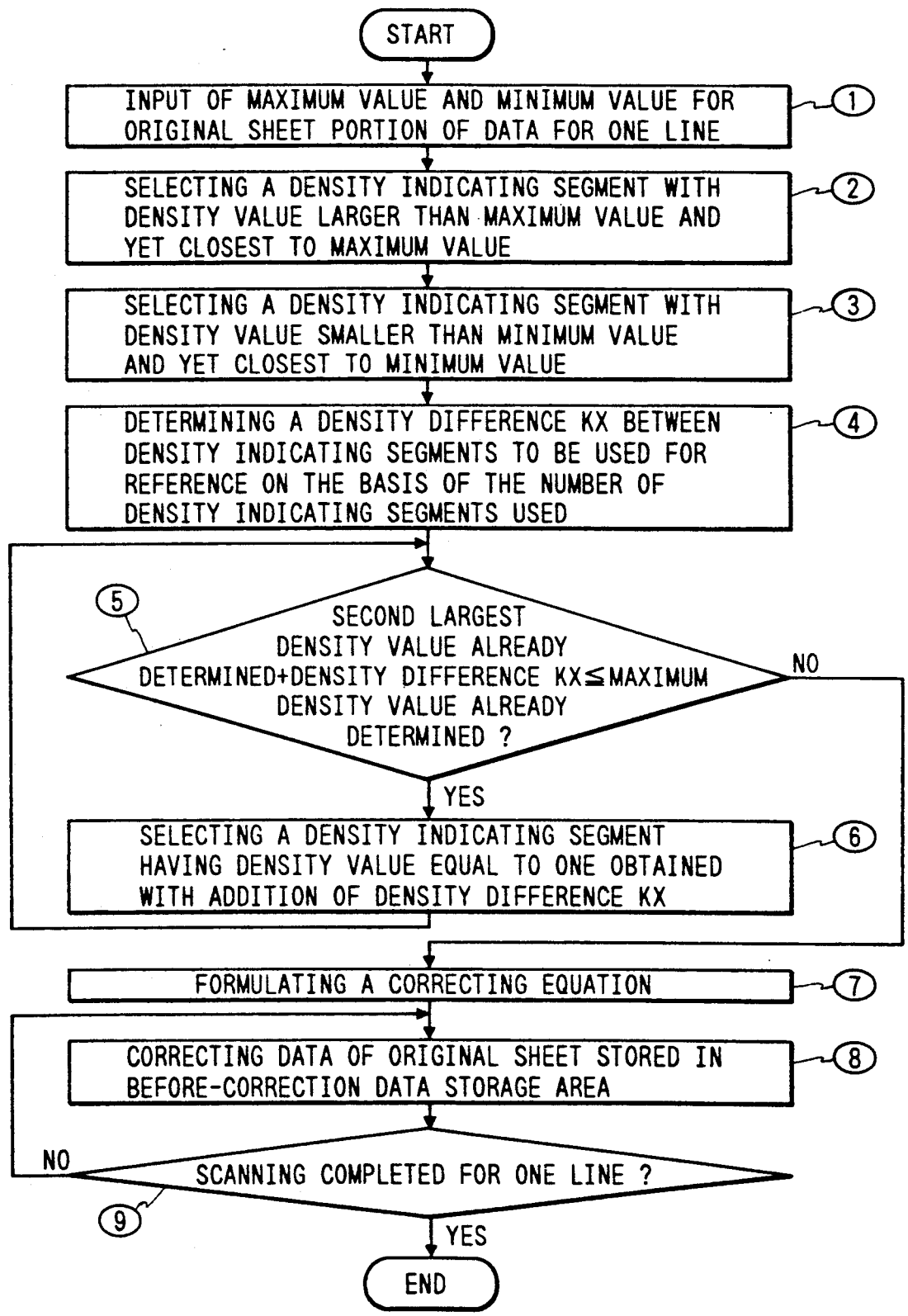
FIG. 34 is a flow chart illustrating corrections using the second density reference plate shown in step 5 of FIG. 33.

FIG. 34 shows the detailed operation of step 5 shown in FIG. 33.

In step 1 in FIG. 34, the CPU 41 inputs the maximum density value and the minimum density value for one line of the original sheet obtained in step 4 shown in FIG. 33. In step 2, the density indicating segment with a density level in excess of, but in the closest approximation to, the maximum density value is selected as the maximum density indicating segment. The selected maximum density indicating segment is stored in the maximum, minimum, and medium density data storage area 44D.

Figure 35:
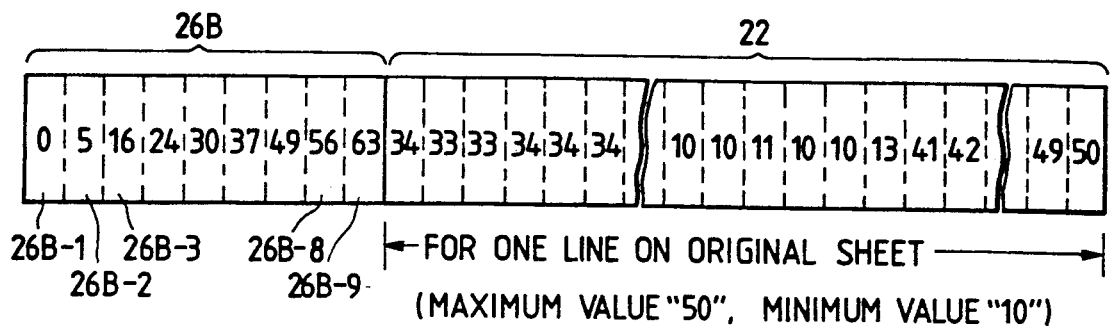
FIG. 35 is a chart illustrating a signal string for a line after correction using the second density reference plate according to the fourth embodiment.

FIG. 35 illustrates a line of data corrected with the first density reference plate 26A. The first nine data pixels represent the density values of the nine density indicating segments of the second density reference plate 26B. The subsequent data pixels are the corrected read density values for the individual lines.

Referring to FIG. 25 and FIG. 35, the known density value of the second density indicating segment 26B-2 is "7", but the once corrected actually read density value is "5". The actual density value "7" is read two stages too dark on this line. The known density value of the third density indicating segment 26B-3 is "15", but the once corrected actually read density value is "16". Thus, the density level in this part of the original sheet is read at a higher degree of brightness than the actual density. The remaining density values do not form a linear proportional relationship with the individual degrees of density because of such factors as fluctuations in the wavelength characteristics of the light source.

The density values from the original sheet 22 on the line shown in FIG. 35 should have a maximum density value "50" and a minimum density value "10" after the first correction is made. Here, the eighth density indicating segment 26B-8, with the density value "56", is selected, in step 2 shown in FIG. 34, as the segment with a density value in excess of the maximum value "50" and in the closest approximation to the maximum value.

The CPU 41 selects a density indicating segment from of the second density reference plate 26B shown in FIG. 35 with a value less than the minimum value "10" and in the closest approximation of the minimum value in step 3 shown in FIG. 34. Here, the second density indicating segment 26B-2, with a known density value "5", is selected. The data indicating this second density indicating segment 26B-2 is stored in the maximum, minimum, and medium density data storage area 44D.

In this example, four density indicating segments are selected from a total of nine density indicating segments 26B-1 through 26B-9. Therefore, two more density indicating segments must be selected. The last two density indicating are selected at intervals as equal as possible between the two already selected density indicating segment 26B-2 and 26B-8. The first to ninth density indicating segments 26B-1 through 26B-9 are arranged at a constant density difference K. In step 4, the density difference KX between the selected density indicating segments (wherein, X=1, 2, ... ) is determined for the number of density indicating segments used to correct the density values. The coefficient X is expressed by the equation (12):

$$X = \frac{\frac{\text{Number of density indicating segments between already selected density indicating segments}}{\text{Number of density indicating segments used}} + 1}{-1} \tag{12}$$

$$= \frac{6}{4-1} = 2$$

After the coefficient X is calculated, the CPU 41, in step 5, determines whether the value obtained by adding the density difference KX to the density value of the density indicating segment which is the second largest of the selected density indicating segments is smaller than the maximum density value of the selected density indicating segments.

If the sum in step 5 is less than the maximum density value of the selected indicating segments, a "Yes" is indicated, and the CPU 41, in step 6, selects the density indicating segment with a density equal to the addition of the density difference KX. The operation then returns to step (5). In step 5, the CPU 41 compares the density determined by adding the density difference KX to the density value of the newly selected density indicating segment and the maximum value of the already selected density indicating segments. Thus, steps 5 and 6 are repeated. If a "No" is ever indicated in step 5, the CPU 41, in step 7, generates a correcting equation for application to the relationship between the density indicating segments.

By the process of step 5 and 6, the fourth density indicating segment 26B-4, with a density value two increments higher than the density level "7" of the second density indicating segment 26B-2, is selected first. The sixth density indicating segment 26B-6, with a density level four increments higher than the second segment, is selected second. The data expressing the two density indicating segments 26B-4 and 26B-6 is stored in the maximum, minimum, and medium density data storage area 44D.

The method of determining the correcting equations using the data on the four density indicating segments 26B-2, 26B-4., 26B-6, and 26B-8 will now be discussed.

Figure 36:
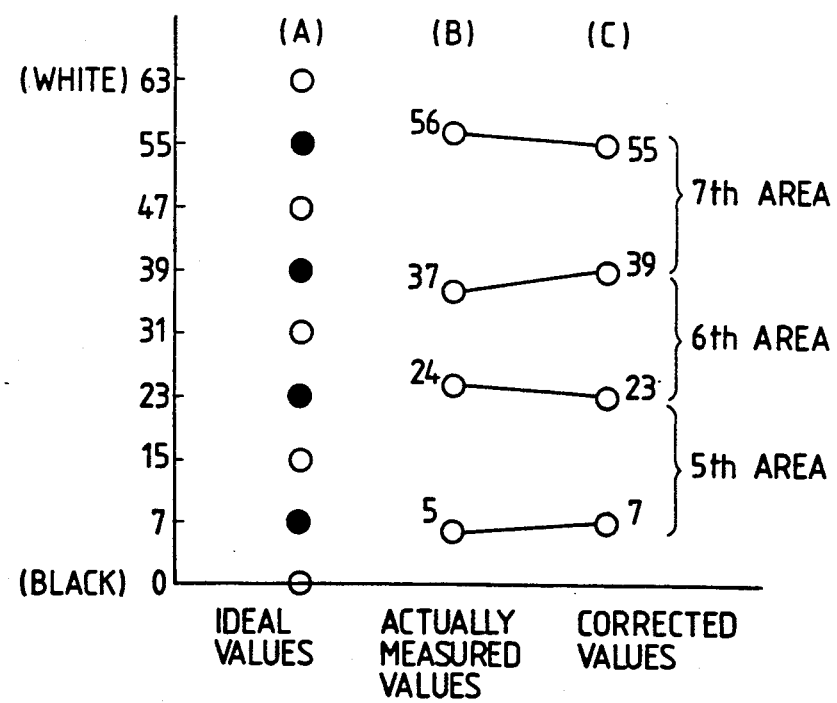
FIG. 36 is a chart illustrating corrections made to density values in relation to the values actually measured from individual density indicating segments on the second density reference plate according to the fourth embodiment.
Figure 37A:
FIGS. 37(a)-(d) illustrate the conventional density correcting procedure, which uses a solid white plate.
Figure 37B:
Figure 37C:
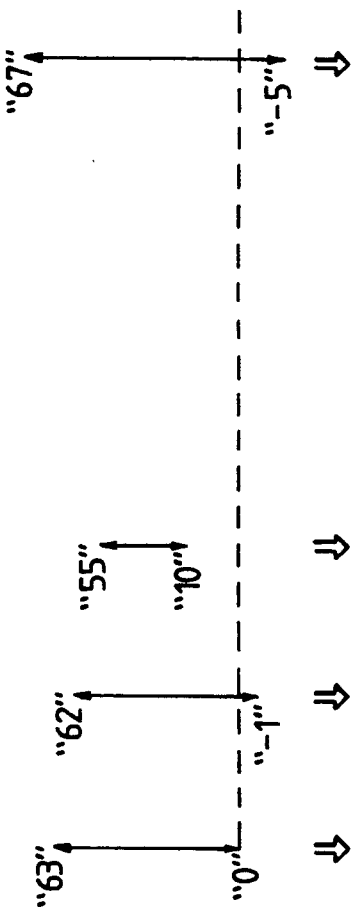
Figure 37D:
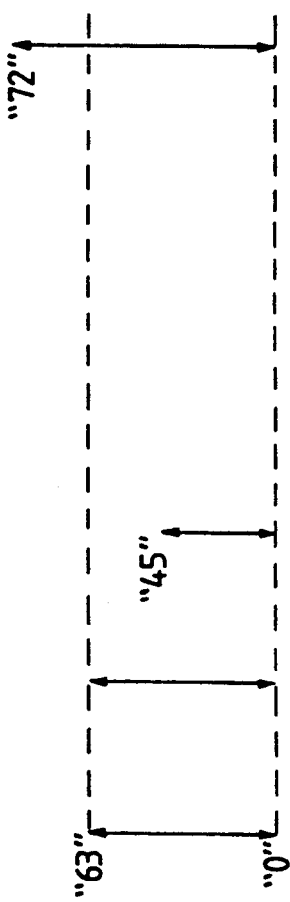
Figure 38:
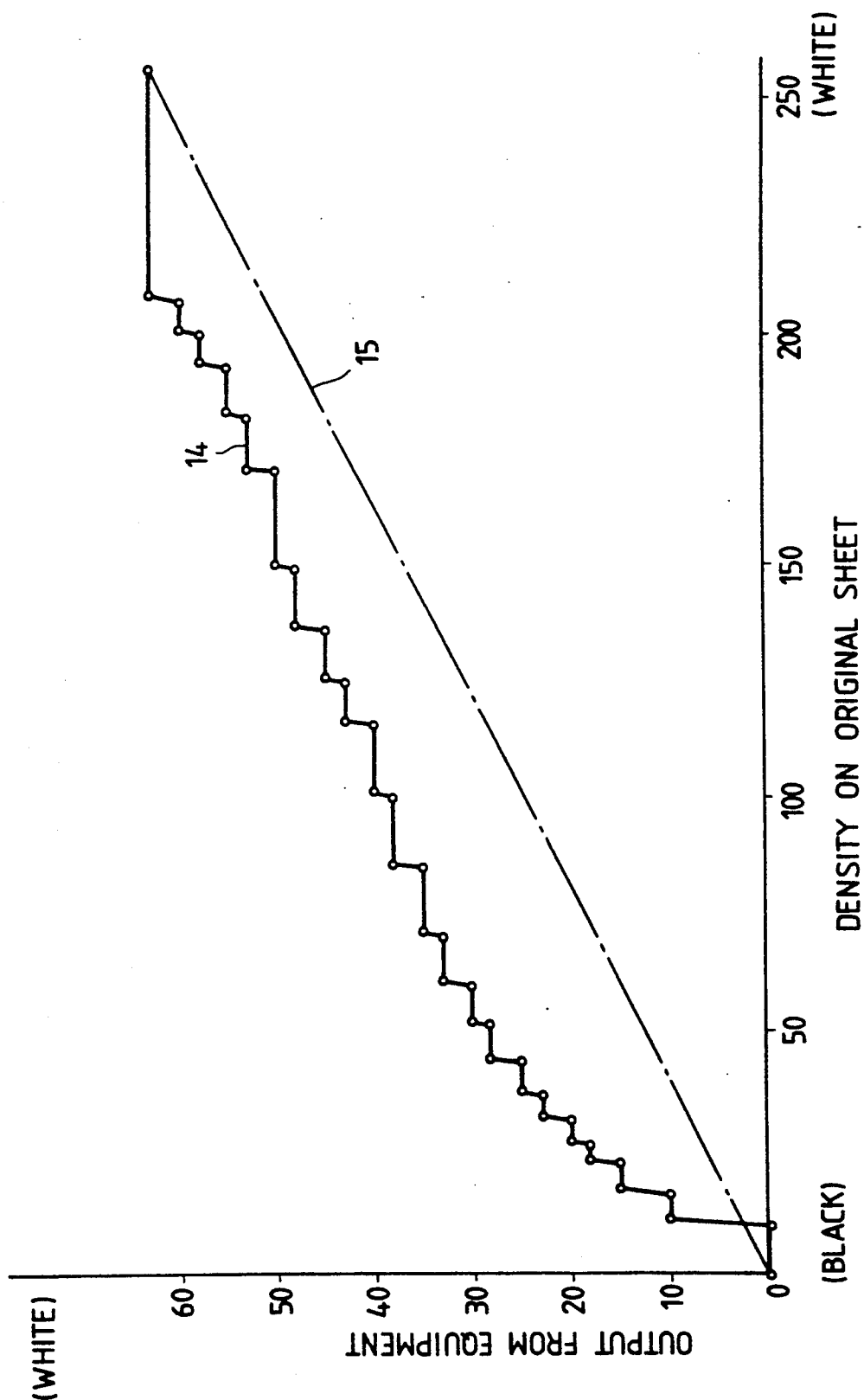
FIG. 38 is a characteristics chart illustrating actual output characteristics from a conventional multiple value image input device.

FIG. 36 shows a method of correcting the actually measured values. FIG. 36 also shows the density of the density indicating segments 26B-1 through 26B-9. Column (A) lists the density levels for the nine density indicating segments 26B-1 through 26B-9 stored in the ROM 43 . The four values marked by a solid dot correspond to the ideal density values of the four selected density indicating segments 27B-2, 26B-4, 26B-6, and 26B-8. The five values marked by a hollow dot correspond to the five density indicating segments, 267B-1, 26B-3, 26B-5, 26B-7, and 26B-9 from 53 to 55 which have not been selected.

In FIG. 36, column (B) lists the actually measured density values stored in the actually measured value storage area 44A. The actually measured density values are corrected to the levels listed under column (C). For example, the actually measured density value of the second density indicating segment 26B-2 is "5", and this value increased by 2 to the density value "7".

The areas between the four selected density indicating segments on the second density reference plate 26B are: the fifth area, the sixth area, and the seventh area starting from the black side.

In the fifth area shown in FIG. 36, the actually measured density values range from "5" to "24" are corrected to density values from "7" to "23". The corrected value is calculated using interpolation equation (13):

$$A_{45} = 7 + \frac{23 - 7}{24 - 5} \times (\text{density value} - 5) \quad (13)$$

The actually measured density value "24" is corrected to the ideal density value "23". The actually measured density value "5" is corrected to the ideal density value "7". An intermediate density value "15" is corrected to 15.36 using equation (13), and the density value "15" is obtained by rounding to the nearest integer with fractions of 0.5 and over rounded upward.

In the sixth area, the ideal density values in the range from "24" to "39". The actually measured density values in the range from "25" to "37", are corrected to the range from "24" to "39". The corrected value $A_{46}$ is calculated using interpolation equation (14):

$$A_{46} = 24 + \frac{39 - 24}{37 - 25} \times (\text{signal level} - 25) \quad (14)$$
$$= 1.25 \times \text{density value} - 7.25$$

The actually measured density level "35" is corrected to the value $A_{46}$ which equal "36.5", which is rounded up to the integer "37" with fractions of 0.5 rounded upward.

The seventh area has density values ranging from "40" to "55". The corrected value $A_{47}$ is calculated using interpolation equation (15):

$$A_{47} = 40 + \frac{55 - 40}{56 - 38} \times (\text{density value} - 38) \quad (15)$$

Referring to FIG. 34, after the individual correcting equations (13) to (15) are determined in step 7, the data on the original sheet, stored in the before-correction data storage area 44B, is corrected using equations (13) to (15) in step 8. In step 9, one line of data is corrected, and the corrected data is stored in the corrected data storage area 44C. When the correcting operation for one line is completed, the operation shown in FIG. 34 is repeated on the next line, until the job is finished.

In the fourth preferred embodiment, two points indicating the reference density are connected by a straight line, and the density values between these two points are corrected by approximation to this straight line. Three or more points may be used to find a density correcting function passing through the points, and to correct the actually obtained multiple value picture image data using the function.

The multiple value image input device described in the fourth example of preferred embodiments according to the present invention selects the desired density indicating segments from a density reference plate working in the subsidiary scanning direction. The device corrects the density values of multiple value picture images at a high processing speed using a small number of density indicating segments.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A method for correcting image data read by an image scanner with at least one pixel detector, the image data represented by image pixels expressed in density gradation levels, the method comprising the steps of:
    providing a plurality of density indicating segments, each segment having a known density gradation level;
    selecting at least one of the plurality of density indicating segments;
    scanning at least one selected density indicating segment to obtain actually read density gradation levels for each pixel detector; and
    comparing the actually read density gradation levels to the known density gradation levels;
    wherein less than all of the density indicating segments are selected.

2. A method for correcting image data as claimed in claim 1 wherein the step of selecting at least one density indicating segment comprises the sub steps of:
    providing a switch; and
    indicating the selected at least one density indicating segment with the switch.

3. A method for correcting image data as claimed in claim 1 wherein the step of selecting at least one density indicating segment comprises the sub steps of:
    scanning some part of the image data;
    determining the maximum density gradation level in the scanned part of the image data;
    determining the minimum density gradation level in the scanned part of the image data;
    calculating at least one density gradation level between the maximum density gradation level and the minimum density gradation level;
    identifying the density indicating segment with a density gradation value in closest approximation to the maximum density gradation level;
    identifying the density indicating segment with a density gradation value in closest approximation to the minimum density gradation level; and
    identifying the density indicating segment with a density gradation value in closest approximation to the at least one density gradation level between the maximum density gradation level and the minimum density gradation level.

4. A method for correcting image data as claimed in claim 3 wherein the calculated at least one density gradation level equally divide the density gradation levels between the maximum density gradation level and the minimum density gradation level.

5. A method for correcting image data as claimed in claim 4 wherein the step of scanning the image data is a prescanning operation performed at a lower resolution than the main scanning operation.

6. A method for correcting image data as claimed in claim 4 further comprising the steps of providing an image memory and storing the scanned image data in the image memory.

7. A method for correcting image data read by an image scanner with at least one pixel detector, the image data represented by image pixels expressed in density gradation levels, the method comprising the steps of:
   providing a first density reference plate having a plurality of density indicating segments, each segment having a known density gradation level;
   providing a second density reference plate having a plurality of density indicating segments, each segment having a known density gradation level;
   scanning the first density reference plate to obtain actually read density gradation levels for each pixel detector;
   comparing the actually read density levels from the first density reference plate with the known density gradation levels from the first density reference plate;
   selecting at least one of the plurality of density indicating segments on the second density reference plate;
   scanning the at least one selected density indicating segment on the second density reference plate to obtain actually read density gradation levels for each pixel detector; and
   comparing the actually read density levels from the at least one selected density indicating segment on the second density reference plate with the known density gradation levels from the second density reference plate.

8. A method for correcting image data as claimed in claim 7 wherein less than all of the density indicating segments are selected.

9. A method for correcting image data as claimed in claim 8 wherein the step of selecting at least one density indicating segment comprises the sub steps of:
   providing a switch; and
   indicating the selected at least one density indicating segment with the switch.

10. A method for correcting image data as claimed in claim 8 wherein the step of selecting at least one density indicating segment comprises the sub steps of:
    scanning some part of the image data;
    determining the maximum density gradation level in the scanned part of the image data;
    determining the minimum density gradation level in the scanned part of the image data;
    calculating at least one density gradation level between the maximum density gradation level and the minimum density gradation level;
    identifying the density indicating segment with a density gradation value in closest approximation to the maximum density gradation level;
    identifying the density indicating segment with a density gradation value in closest approximation to the minimum density gradation level; and
    identifying the density indicating segment with a density gradation value in closest approximation to the at least one density gradation level between the maximum density gradation level and the minimum density gradation level.

11. A method for correcting image data as claimed in claim 10 wherein the calculated at least one density gradation level equally divide the density gradation levels between the maximum density gradation level and the minimum density gradation level.

12. A device for correcting image data read by an image scanner with at least one pixel detector, the image data represented by image pixels expressed in density gradation levels, comprising:
    a plurality of density indicating segments, each segment having a known density gradation level;
    selecting means for selecting at least one of the plurality of density indicating segments;
    scanning means for scanning at least one selected density indicating segment to obtain actually read density gradation levels for each pixel detector; and
    comparing means for comparing the actually read density gradation levels to the known density gradation levels;
    wherein less than all of the density indicating segments are selected.

13. A device for correcting image data as claimed in claim 12 wherein the selecting means comprises a switch for indicating the selected at least one density indicating segment.

14. A device for correcting image data as claimed in claim 12 wherein the selecting means comprises:
    scanning means for scanning some part of the image data;
    first determining means for determining the maximum density gradation level in the scanned part of the image data;
    second determining means for determining the minimum density gradation level in the scanned part of the image data;
    calculating means for calculating at least one density gradation level between the maximum density gradation level and the minimum density gradation level;
    identifying means for identifying the density indicating segment with a density gradation value in closest approximation to the maximum density gradation level;
    identifying means for identifying the density indicating segment with a density gradation value in closest approximation to the minimum density gradation level; and
    identifying means for identifying the density indicating segment with a density gradation value in closest approximation to the at least one density gradation level between the maximum density gradation level and the minimum density gradation level.

15. A device for correcting image data as claimed in claim 14 wherein the calculated at least one density gradation level equally divide the density gradation levels between the maximum density gradation level and the minimum density gradation level.

16. A device for correcting image data as claimed in claim 15 wherein the step of scanning the image data is a prescanning operation performed at a lower resolution than the main scanning operation.

17. A device for correcting image data as claimed in claim 15 further comprising the steps of providing an image memory and storing the scanned image data in the image memory.

18. A device for correcting image data read by an image scanner with at least one pixel detector, the image data represented by image pixels expressed in density gradation levels, comprising:

a first density reference plate having a plurality of density indicating segments, each segment having a known density gradation level;

a second density reference plate having a plurality of density indicating segments, each segment having a known density gradation level;

second scanning means for scanning the first density reference plate to obtain actually read density gradation levels for each pixel detector;

first comparing means for comparing the actually read density levels from the first density reference plate with the known density gradation levels from the first density reference plate;

selecting means for selecting at least one of the plurality of density indicating segments on the second density reference plate;

second scanning means for scanning the at least one selected density indicating segment on the second density reference plate to obtain actually read density gradation levels for each pixel detector; and second comparing means for comparing the actually read density levels from the at least one selected density indicating segment on the second density reference plate with the known density gradation levels from the second density reference plate.

* * * * *